United States Patent [19]

Negm et al.

[11] Patent Number: 5,376,755
[45] Date of Patent: Dec. 27, 1994

[54] COMPOSITE LEAD FOR CONDUCTING AN ELECTRICAL CURRENT BETWEEN 75–80K AND 4.5K TEMPERATURES

[75] Inventors: Yehia Negm, Braintree; George O. Zimmerman, South Hamilton; Robert E. Powers, Jr., East Boston, all of Mass.; Randy J. McConeghy, Waxahachie, Tex.; Alvaro Kaplan, Brookline, Mass.

[73] Assignee: Trustees of Boston University, Boston, Mass.

[21] Appl. No.: 866,595

[22] Filed: Apr. 10, 1992

[51] Int. Cl.$^5$ ............................................. H01B 12/00
[52] U.S. Cl. ............................ 505/231; 174/15.4; 174/125.1; 174/15.5; 505/885; 505/220
[58] Field of Search ................ 174/15.4, 15.5, 125.1; 29/599; 501/1, 701, 704, 826, 856, 884, 885, 886, 887

[56] References Cited

U.S. PATENT DOCUMENTS 4,279,944 7/1981 Laskaris ........................... 29/599

4,965,246 10/1990 Suzawa ................................ 505/1

FOREIGN PATENT DOCUMENTS

| 0043388 | 4/1977 | Japan | 174/15.4 |
| 0080877 | 4/1986 | Japan | 505/875 |
| 0003911 | 1/1989 | Japan | 505/884 |
| 0484597 | 9/1975 | U.S.S.R. | 174/15.4 |

Primary Examiner—Leo P. Picard
Assistant Examiner—Hyung S. Sough
Attorney, Agent, or Firm—David Prashker

[57] ABSTRACT

A composite lead is provided which electrically links and conducts a current between about 75–80K. and liquid helium temperature of about 4.5K. The composite lead may be employed singly or in multiples concurrently to provide conduction of electrical current from normal conductors and semi-conductors at room temperature to superconductors operating at 4.5K. In addition, a variety of organizationl arrangements and assemblies are provided by which the mechanical strength and electrical reliability of the composite lead is maintained.

4 Claims, 11 Drawing Sheets

COMPOSITE LEAD FOR CONDUCTING AN ELECTRICAL CURRENT BETWEEN 75–80K AND 4.5K TEMPERATURES

RESEARCH SUPPORT

This invention was made with Government Support under Contract No. DE-AC02-89ER40486 between Universities Research Association, Inc. and the Department of Energy. The Government has certain rights in this invention.

FIELD OF THE INVENTION

The present invention is concerned with electrically conductive composite articles able to join electrically conductive metals and/or ceramics together at temperatures between about 75–80K. and 4.5K.; and is particularly directed to feedthrough composite leads and assemblies which provide minimal electrical interface resistance and heat conduction when employed electrically to join superconductors to normal conductors or to semi-conductors.

BACKGROUND OF THE INVENTION

Superconductivity was first observed by the Dutch physicist H. K. Onnes in 1911 during his investigations of the electrical conductivities of metals at very low temperatures. He observed that as purified mercury is cooled, its electrical resistivity vanishes abruptly at a temperature of 4.16K. Above this temperature, the electrical resistivity is small but finite and measurable; alternatively, when the temperature is reduced below 4.16K., the electrical resistivity is so small that it is effectively zero. This distinct temperature at which the transition and loss of effective electrical resistivity occurs has been termed the critical temperature or "$T_c$". Onnes believed he had discovered a new physical state of matter at temperatures below the critical temperature and coined the term "superconducting state" for the observed phenomenon at temperatures below the critical temperature ($T_c$) and the term "normal state" for the electrical properties observed at temperatures above the critical temperature. Onnes also found that the superconducting transition is reversible and that the superconducting material recovered its normal, electrical resistivity at the critical temperature.

The modern theory of superconductivity is the result of the research investigations by Bardeen, Cooper, and Schrieffer [*Phys. Rev.* 106:162 (1957)]. Their proposal, conventionally known as the "BCS theory", has now gained universal acceptance because it has proved capable of explaining most of the observed phenomena relating to superconductivity. Their principles employ a quantum mechanical treatment of the superconductive phenomenon; and their theory has been employed to explain the various observable effects such as zero electrical resistance, the Meissner effect, and the like. Since the BCS theory is so steeped in quantum mechanics, the reader is directed to published texts in the scientific literature for a complete description and explanation. These include: M. A. Omar, *Elementary Solid State Physics: Principles and Applications*, Addison-Wesley Publishing Company, 1975, pages 496–527; M. Tinkham, *Introduction to Superconductivity*, McGraw-Hill Co., 1975.

Superconductivity has been found not to be a rare phenomenon. It is exhibited by a substantial number of atomic elements, metallic alloys, and most recently, refractory oxide ceramics. For many years, the highest known critical temperature was only 23K. There has, accordingly, been intense interest and research investigations into finding superconductive materials with much higher critical temperatures, most desirably those which hopefully would approach room temperature (20C.). Until relatively recently, efforts to achieve this goal have met with complete failure. Beginning about 1986, however, polycrystalline sintered ceramic pellets of yttrium-barium-copper oxide and mixtures of potassium, barium, bismuth, and oxygen without copper have been found to demonstrate relatively high critical temperatures ($T_c$) and superconductivity at temperatures up to 120K. [Bednorz, J. G. and K. A. Muller, *Z. Phys. B*64:189 (1986); Wu et al., *Phys. Rev. Lett.* 58:905 (1987); and Chu et al., *Phys. Rev. Lett.* 60:941 (1988)]. These compounds are now conventionally termed "high $T_c$" superconductors.

Since about 1986, however, the interest in superconductive materials as potential replacements for conventionally known metal alloy wiring and microcircuitry has risen appreciably; and the search for ever-higher $T_c$ superconductors in various formats is presently an area of intense exploration. Merely representative of these continuing research investigations and recently reported developments are the following publications: *Experimental Techniques in Condensed Matter Physics at Low Temperatures*, (R. C. Richardson and E. N. Smith, editors), Addison Wesley Inc., 1988, pages 118–123; G. K. White, *Experimental Techniques in Low-Temperature Physics*, Oxford University Press, 1959, pages 295–298; *Advances in Superconductivity*, Proceedings of the 1st International Symposium on Superconductivity, August 1988, Nagoya, Japan; Yeh et al., *Phys. Rev. B*36:2414 (1987); Morelli et al., *Phys. Rev. B*36:3917 (1987); Chaudhari et al., *Phys. Rev. B*36:8903 (1987); Tachikawa et al., *Proc. IEEE* 77:1124 (1989); Tabuchi et al., *Appl. Phys. Lett.* 53:606 (19898); Sacchi et al., *Appl. Phys. Lett.* 53:1111 (1988); Abell et al., *Physica C*162–164:1265 (1989); Bailey et al., *Physica C*167:133 (1990); Xiao et al., *Phys. Rev. B*36:2382 (1987); Matsuda et al., *Mat. Res. Soc. Symp. Proc.* 99:695 (1988); Witanachchi et al., *J. Mater. Res.* 5:717 (1990); *Superconductive Industry*, Winter, 1989, page 31; *Engineer's Guide to High-Temperature Superconductivity*, Wiley & Sons, Inc., 1989; and D. Newman, Superconductive *Industry* 3:16 (1990).

A concomitant and continuing problem has also arisen regarding the electrical joining of superconductive materials, particularly the juncture of high $T_c$ superconductors to each other and to other electrically conductive materials in the normal state at temperatures between 70K. and 300K. and to conventional superconductive materials which have a transition temperature below 20K. By definition, electrically conductive materials in the normal state include both the normal conductors such as gold, silver, copper, and iron; and the semi-conductors such as carbon, silicon, gray tin, and germanium as well as their mixtures with indium, gallium, antimony, and arsenic. It is also difficult to make effective adhesive and low resistance junctions to the atomic elements and alloys most frequently use in practical superconducting applications. These are the conventional superconductors Nb, NbTi, and NbSn; and they typically serve as materials used to make superconducting motors, generators, and magnets which operate at liquid helium temperature (4.5K.).

Traditionally, solders—a general term for alloys useful for joining metals together by the process of soldering—have been used to electrically join conductors to themselves and to semi-conductors. The principal types of solder conventionally known are: soft solders such as lead-tin alloys; and brazing solders such as alloys of copper and zinc and sometimes silver. Representative of conventionally known solders and soldering techniques are U.S. Pat. No. 3,600,144 describing a low melting point brazing alloy; U.S. Pat. No. 4,050,956 describing a method of chemically bonding metals to refractory oxide ceramics; U.S. Pat. No. 4,580,714 disclosing a hard solder alloy comprising copper, titanium, aluminum, and vanadium; U.S. Pat. No. 4,582,240 revealing a method for intermetallic diffusion bonding of piezo-electric components; U.S. Pat. No. 4,621,761 identifying a brazing process for forming strong joints between metals and ceramics while limiting the brazing temperature to not more than 750C.; and U.S. Pat. No. 4,631,099 describing a method for adhesion of oxide type ceramics and copper or a copper alloy.

More recent attempts to refine specialized techniques for lowering the resistance of electrical contacts between two superconductive materials include vapor deposition of silver followed by annealing bulk sintered samples of yttrium-barium-copper oxide at temperatures up to 500C. for an hour [*Superconductor News*, May-June, 1988, page 5]; the use of laser energy ot deposit a thin film of superconductive yttrium-barium-copper oxide direclty onto a silicon substrate [*Superconductor News*, May-June, 1988, page 1]. Sputter depositing a layer of silver on a yttrium-barium-copper oxide surface [Elkin et al., *Appl. Phys. Lett.* 52 (1988)]; deposition of silver or gold on a superconductive material [Van der Mass et al., *Nature* 328:603 (1987)]; and thermal evaporation of silver on a yttrium-barium-copper oxide surface [Tzeng et al., *Appl. Phys. Lett.* 52 (1988)]. The problem with all these methods is that each requires the extensive use of vacuum deposition equipment.

Clearly, therefore, there remains a well recognized need for tangible means by which to join normal conductors and semi-conductors which are electrically functional at temperatures between 300K. to 70K. to those low temperature superconductors which become electrically valuable below 10K. If such an electrically conductive article were available, the electrical junction and union between the electrical circuits and instruments of our everyday world could then be linked and employed in combination with the minimal electrical resistance of circuits provided by superconductors generally. Such a linkage and means for electrical juncture, however, have previously been unknown in this art.

SUMMARY OF THE INVENTION

The present invention provides a composite lead for conducting an electrical current between temperatures from about 75–80K. to about 4.5K., said composite lead comprising:

a plurality of discrete superconductive elements of determinable dimensions and configuration which are spaced co-axially from one another, each of said co-axially; spaced elements having first and second axial ends and an axially extended body, and having a determinable thermal expansion coefficient, and being comprised of at least one high transition temperature superconductors; and an electrically non-conductive, filler material covering and encapsulating each of said co-axially spaced superconductive elements over most of said axially extended bodies without covering said first and second axial ends to form an integral unit, said filler material being resistant to the effects of temperature differences from about 75–80K. to about 4.5K. and having a thermal expansion coefficient substantially similar to said thermal expansion coefficient of said superconductive elements.

The present invention also provides a composite lead assembly for conducting an electrical current between temperatures from about 75–80K. to about 4.5K. said composite lead assembly comprising:

a composite lead comprised of a plurality of discrete superconductive elements of determinable dimensions and configuration which are spaced co-axially along their lengths from one another, each of said co-axially spaced elements having first and second axial ends and an axially extended body, and having a determinable thermal expansion coefficient, and being comprised of at least one high transition temperature superconductor, and an electrically non-conductive, filler material covering and encapsulating each of said co-axially spaced superconductive elements over most of said axially extended bodies without covering said first and second axial ends to form an integral unit, said filler material being resistant to the effects of temperature differences from about 300K. to about 4.5K. and having a thermal expansion coefficient substantially similar to said thermal expansion coefficient of said superconductive elements;

means for electrically joining said first axial ends of said composite lead to a normal electrical conductor for use at a temperature of about 75–80K.; and means for electrically joining said second axial ends of said composite lead to a low transition temperature superconductor for use at a temperature of about 4.5K.

BRIEF DESCRIPTION OF THE DRAWING

The present invention may be more easily and completely understood when taken in conjunction with the accompanying drawing, in which.

DETAILED DESCRIPTION OF THE PRESENT INVENTION

Figure 1:
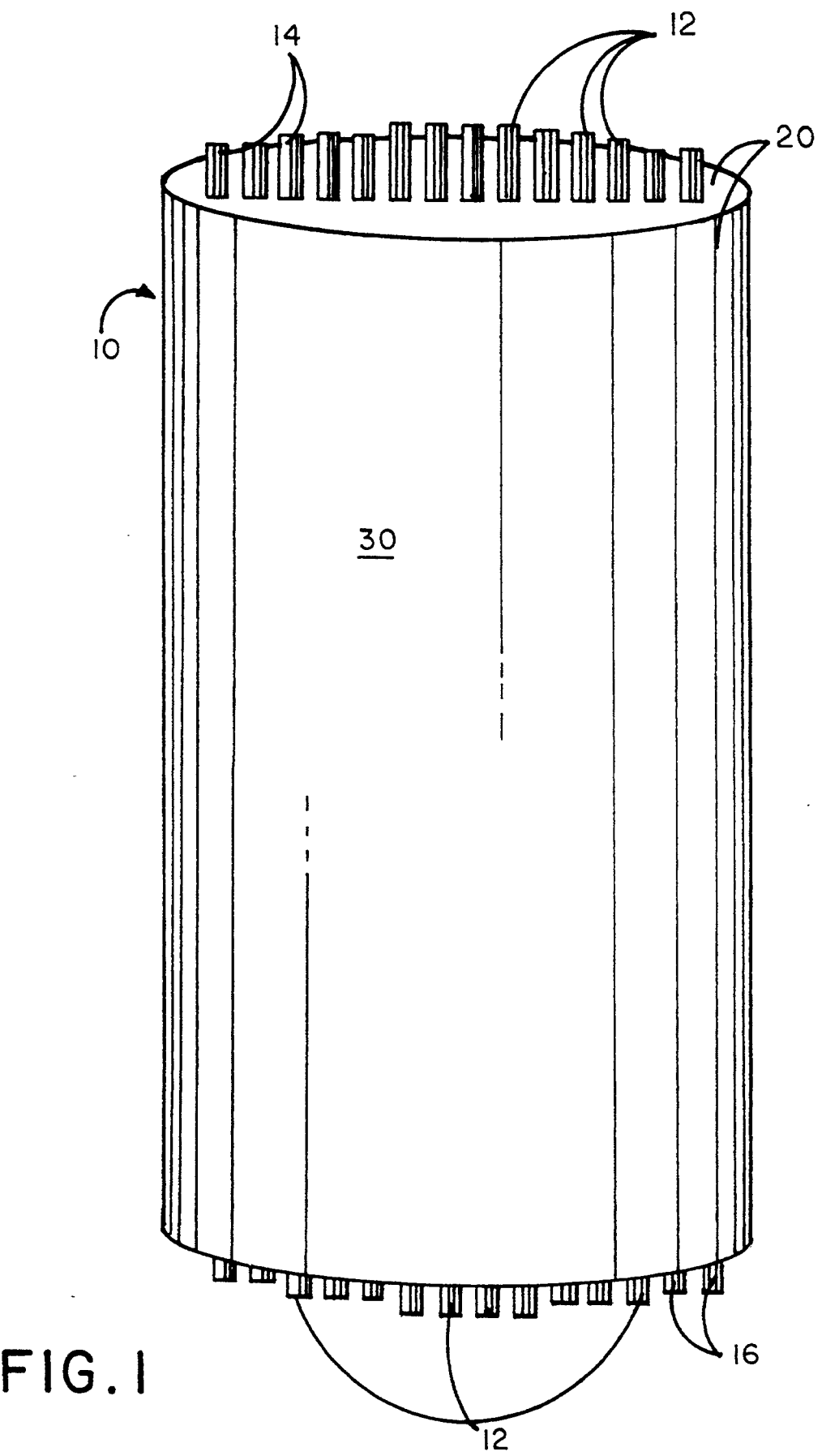
FIG. 1 is a perspective view of a preferred embodiment of the composite lead comprising the present invention.

The present invention is an article of manufacture which allows the user to bridge and join electrical circuits which are functional at room temperature or helium temperatures—that is, 300K. and 4.5K. respectively. The composite lead or feedthrough article provides multiple electrical leads and is capable of conducting 100 amperes or more of electrical current between the different temperature regions. This feedthrough or composite lead will typically be employed within an assembly which maintains the temperature differences between 300K. and 4.5K. respectively; and by its construction the feedthrough composite minimizes heat conduction and reduces heating in the electrically conductive leads. In this manner, the feedthrough composite provides an effective, low cost, and reliable means of conducting electrical current between room and helium temperatures over indefinite time periods.

The present invention provides a number of unusual benefits and numerous advantages over the conventionally known feedthrough technologies. Among these benefits and advantages are the following:

1. The feedthrough article or composite lead is comprised of non-conducting filler materials such as epoxy and high transition temperature superconductor (hereinafter "HTSC" or "high $T_c$") conductive elements. Both the non-conductive filler material and the HTSC elements demonstrate low thermal conductivities; and, therefore, the feedthrough composite as a formed integral unit minimizes heat flow and heat conduction to the 4.5K. temperature zone.

2. As a result of the composite lead or feedthrough article having a plurality of superconducting elements, the composite lead eliminates the generation of electrical power and consequent heating from within the lead itself. Thus, by this unique construction and organization, the present composite lead eliminates heat flow to the 4.5K. temperature region from resistive electrical heating—which otherwise would be present using conventionally known articles.

3. The feedthrough article or composite lead has greatly; enhanced mechanical strength in comparison to conventionally known articles and is able to withstand and resist the deterioration effects of temperature differences and gradients between 300K. and 4.5K. The composite lead does not become brittle, fragile, or fragmentary despite repeated use over time. To the contrary, the feed through composite provides unusual mechanical and tensile strength over long duration.

4. The present invention envisions and allows the use of high transition temperature superconductive compositions (HTSC) which may be alternatively formatted as thin films, thick films, and/or bulk modes. Moreover, each of these formats may be individually prepared in laminated and/or multi-laminated constructions for use as the superconducting elements of the composite lead in its fully integrated form. This range and variety of formats and structures for the HTSC elements allows the user to customize and optimize those properties and characteristics which are most advantageous for the particular use circumstances or applications intended.

5. The present composite lead enhances the electrical current carrying capacity of connector articles beyond currently accepted limits for a specified heat loss at 4.5K. temperatures; and permits the conduct ion of 100 amperes or more across the temperature gradient differences between 75–80K. and 4.5K. in a reliable and regular manner. It is presently recognized that the critical current density increases with a decrease in the cross-sectional area of a HTSC conductor. Thus, the filamentary, bulk, or laminar structures provided by the superconductive elements of the present invention greatly enhance and enlarge the current carrying capacity above anything presently envisioned by persons working in this field presently.

It will be recognized and appreciated that the present invention provides both the essential composite lead as an article of manufacture as well as an organized assembly into which the composite lead is intended to be placed in order that the best use and maximum advantage of the feedthrough article be obtained. For these reasons, the detailed description will be presented in a series of sequential textual sections so that an easier and more complete understanding is provided. The text will therefore be presented in the following order: a detailed disclosure of a preferred embodiment of the composite lead; a recitation of the manner in which this preferred embodiment of the composite lead is made; a description of the essential component parts and non-essential features comprising the composite lead of the present invention; a depiction of a typical assemblies in which the composite lead is expected to be employed as a feedthrough article; and an account of experiments and empirical data evidencing and demonstrating the characteristics and properties of the composite lead in its intended use setting.

I. A PREFERRED COMPOSITE LEAD

Figure 2:
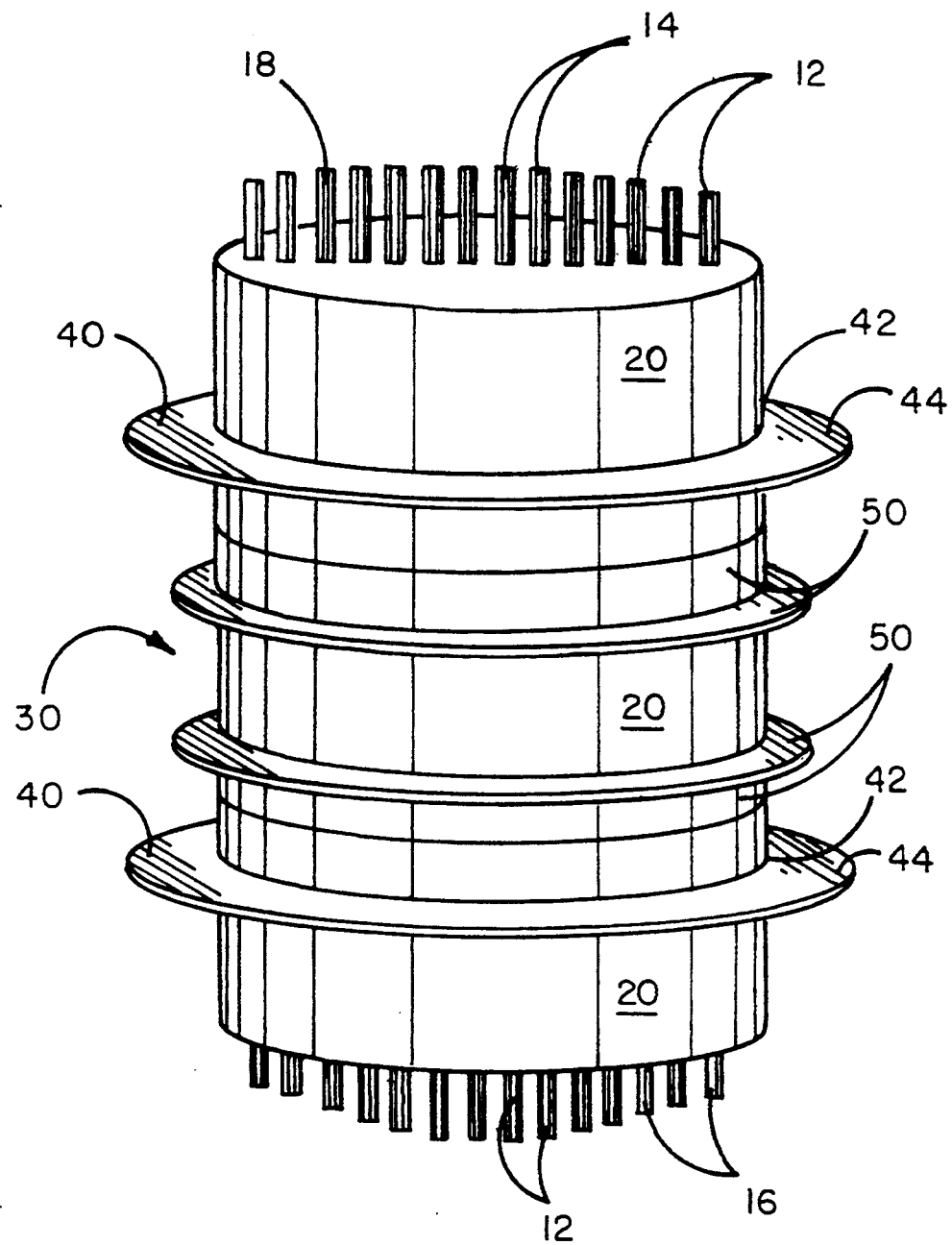
FIG. 2 is a perspective view of another embodiment of the composite lead comprising the present invention.

A preferred feedthrough composite which is able to transmit electrical current from 75–80K. current sources to superconducting circuits and materials operating at helium temperature of about 4.5K. is illustrated by FIGS. 1 and 2 respectively. The essential construction of the preferred composite lead is shown by FIG. 1; the presence of some non-essential attachments and features for mounting, supporting, and anchoring the composite lead to the differing temperature regions during intended usage in an assembly is shown by FIG. 2. As seen therein, the composite lead 10 is comprised of a plurality of superconductive elements 12, each of which is individually potted in an electrically non-conductive filler material 20. Each of these superconductive elements 12, which are optionally configured as extended rods in this preferred embodiment, have a first axial end 14, a second axial end 16, and an axially extended body 18. Each of the discrete superconductive elements 12 are spaced coaxially from one another over the entire length of the composite lead itself.

Thus, as shown within FIGS. 1 and 2, each of the superconductive elements are aligned essentially in parallel as a series of adjacently positioned rods. By arbitrary choice for this embodiment, the first axial end 14 of each superconductive element 12 is oriented towards the intended 75–80K. temperature direction; whereas the second axial end 16 is arbitrarily chosen to be in future contact with the intended liquid helium temperature (4.5K.) region. It will be recognized and appreciated, however, that the respective axial ends 14,16 may be reversed at the whim or need of the user; and that the first axial end 14 and the second axial end 16 are substantially identical in all respects until the respective electrical junctions at each temperature are made.

Each of the superconductive elements 12 is composed of at least one superconductive material which is preferably a high transition temperature superconductor or "HTSC". Moreover, each discrete superconductive element 12 has an individual and determinable thermal expansion coefficient which is characteristic of the chosen HTSC material; its format (thin film, thick film, or bulk); and the mode of construction for each element (as being a laminated or non-laminated structure).

The electrically non-conductive filler or potting composition surrounds and covers most of the extended axial body 18 of each superconductive element 12 individually. The non-conductive filler composition thus encapsulates each of these coaxially spaced superconductive elements 12 over the majority of their axially extended body 18 but without covering either the first axial end 14 or the second axial end 16. The non-conductive potting material 20 in combination with the plurality of axially spaced superconductive elements 12 form an integral unit 30 which is the minimal structure and essential construction of the composite lead as a whole which is the present invention. The filler material 20 thus not only holds and supports each of the individual superconductive elements 12 at fixed spatial positions from each other; but also encapsulates and protects each of the coaxially spaced superconductive elements 12 over most of their extended body lengths cumulatively and collectively to form an integrated unit of prechosen dimensions, bulk, and configuration.

The chosen filler material may be one of a variety of potting compositions, whose membership collectively form a class which share common characteristics and properties. Among these properties and characteristics of the members forming this class are the following: each filler material is chemically and physically resistant to the effects of temperature differences from about 300K. to about 4.5K. In addition, each of the chosen filler materials have been carefully prepared and adjusted to demonstrate a thermal expansion coefficient which is substantially similar, if not identical, to the thermal expansion coefficient of the superconductive element comprising the composite lead as an integral unit. Thus, there is a purposeful matching, alignment, and selection of high $T_c$ materials which are to be employed as superconductive elements 12 with the non-conductive filler material 20 such that each of them reveals and evidences substantially similar coefficients of thermal expansion.

Furthermore, it is desirable that the electrically non-conductive potting composition 20 covering and encapsulating each of the coaxially spaced superconductive elements over most of their axially extended body provide a high degree of mechanical and tensile strength; be relatively inflexible and rigid after being combined with the superconductive elements and forming the integral unit; that the filler material desirably be impervious to liquids and/or gases; and that the filler material be durable over a duration of years without becoming fragmented, rippled, or unstable.

It will be recognized and appreciated that the composite lead of FIG. 1 provides low electrical resistance contacts and electrical junctures at its first axial ends 14 with normal electrical conductors at 75–80K. temperatures as well as at its second axial ends 16 for juncture with superconducting metals or alloys at 4.5K. temperatures. The electrical junctures at each axial end 14,16 are preferably made by metalizing the HTSC material using specialty alloy solders (such as those described with U.S. Pat. No. 4,966,142, the text of which is expressly incorporated by reference herein). The low electrical resistivity contacts and junctures prevent the generation of electrical heat at the contact points, thereby keeping the HTSC elements below superconducting temperatures. Moreover, since the second axial ends 16 are electrically joined at about 4.5K., these contacts and junctures are virtually superconducting themselves.

Several non-essential features and attachments may be optionally joined to or mounted upon the formed integral unit 30 as revealed by FIG. 2. As shown therein, a plurality of foils 40, preferably composed of copper or other thermally conductive metals, have been embedded into the non-conductive filler material 20 during the construction of the integral unit 30. It is most desirable that these foils 40 be positioned in the filler material with their orientation in a plane or axis which is substantially perpendicular to the position or axis of the integral unit 30. Each of these foils has an embedded edge 42 and an extended perimeter 44 which are intended to become physically linked and thermally anchored to an assembly or apparatus which will provide a range of ever decreasing temperatures between 75–80K. and 4.5K. These foils 40 are attachments to the minimal composite lead 10 in order to facilitate thermal contact with the varying temperature reservoirs; and to prevent intermixing of the different temperature regions in which the feedthrough composite lead is expected and intended to be employed functionally and advantageously.

Another optional feature is the use of flanges 50 which are disposed directly; on the contoured form and bulk of the non-conductive filler material 20 comprising the integral unit. Such flanges are made of resilient metals or polymers; and once situated around the circumference of the integral unit 30 as shown within FIG. 2, these flanges 50 will permit the composite lead to be mounted, held, and supported within a prepared assembly or apparatus without difficulty or major effort being expended.

II. MAKING THE COMPOSITE LEAD

The superconductive elements which make up the multi-element feedthrough composite are desirably constructed from slabs of bulk HTSC; but various other formats for HTSC are equally suited for this application such as multi-layered thick films and multi-layered bulk samples. All of these formats take advantage of the thickness effect on the critical current density—which is the empirical observation that the critical current density of a layer increases as the thickness of that layer decreases. The use of multiple elements thus serves several purposes: the first is to take advantage of the above current density effect. The second is to make the overall integral unit more reliable against the failure of a single HTSC element. Additionally, the thermal stability is increased and the effect of the self-field on the critical current carrying capacity of the composite lead is improved.

The construction of a feedthrough article or composite lead consisting of bulk HTSC conducting elements is described in detail herein as the preferred embodiment. However, the construction of a composite lead using HTSC in the alternative formats is the same except for the preparation of the elements themselves (which are here assumed to have been obtained from commercial sources).

The HTSC elements used herein are obtained commercially in the dimensions and with the appropriate superconducting characteristics considered suited for this application. Typical HTSC slab dimensions for a 100A feedthrough composite are: a thickness of 0.1–5 mm; a width of 1–10 mm; a length of 15–30 cm. In this construction, the electrical current flows along the axial length dimension of the elements. The cross-section for current flow is then determined by the thickness and width of the individual elements. The minimum thickness is limited by the handling considerations since the HTSC is a brittle material.

For the purpose of making contacts to either end of the slabs, a layer of a conducting metal, such as silver, is deposited onto the surfaces of the elements at their ends for a distance of about one centimeter from either axial end. The elements are then oxygen annealed to restore the oxygen content of the HTSC.

To form the composite lead, the HTSC elements are most desirably potted in an epoxy compound whose thermal expansion coefficient has been matched to that of the HTSC. This is done by the addition of suitable fillers to the epoxy. A typical potting epoxy for this purpose is Stycast 2850 (supplied by Emerson Cummings Co.); and is obtainable from commercial sources. First, a suitable number of HTSC elements are chosen in order to obtain a sufficient total conducting cross-section for the current to be carried by the composite conductor. This is determined by the critical current density of the elements with some allowance for variance. For the 100A composite conductor, a 0.2 $cm^2$ total cross-sectioned area is considered satisfactory; and thus, 20 discrete elements are required. The HTSC elements are arranged and aligned next to each other with their linear axial dimensions positioned in parallel. They are in close proximity, but are not necessarily in contact and are most frequently in electrical isolation. They preferably are held in position at either axial end for potting by slotted disks constructed for this purpose. The disks will form the end caps of a potting container or mold. The disks are positioned along the edge of the mold so that the axial ends of the elements will not lie within the epoxy casting.

If desired, in order to allow for conduction cooling of the individual HTSC elements, several separate layers of thermally conducting foil, such as copper, may be optionally placed in thermal (but not electrical) contact with the elements at several locations along their lengths; and the central planes of the foil layers preferably will lie perpendicular to the linear axis of the elements. The foil layers have tabs (made out of foil) which will be allowed to protrude from the sides of the epoxy cast for making thermal contact to the elements by pressure or soldering.

The act of potting is achieved by enclosing the HTSC elements in a tube-like container or mold made of glass which is lined with non-sticking plastic or wax around. The bundle of HTSC elements and the slotted disks holders are positioned within the tube-like glass container, one end of the glass container having been plugged with grease beforehand. The fluid epoxy is poured into the glass container and is allowed to cure and harden. The result is a multi-element HTSC composite lead which can be slid out of the glass container as an integral unit. Most of the length and volume of the HTSC elements are protected from the liquid helium environment and from rough handling by the rugged potting epoxy. The axial ends of the elements protrude from either end of the epoxy cast and are ready for making electrical contact and juncture within an assembly.

III. COMPONENT PARTS CONSTITUTING THE COMPOSITE LEAD

The purpose and construction of the composite lead which is the present invention transmits electrical current from 75–80K. temperature sources to superconducting leads operating at liquid helium (4.5K.) temperature. The manufactured integral unit comprises multi-elements of high transition temperature superconducting matter prepared as a plurality of superconductive elements lying in parallel which are potted in an electrically non-conductive filler material which has a thermal expansion coefficient substantially matched to that of the HTSC material. The HTSC elements are superconducting at and below 80K. and individually have low thermal conductivity. The filler material is chosen to have low thermal conductivity and a minimal cross-sectional area in order to minimize conduction of heat from the 80K. temperature region into the 4.5K. temperature region.

The construction arrangement employing a plurality of superconductive elements in parallel thus is intentionally chosen: (1) to minimize conduction of heat from 75–80K. temperature region into the 4.5K. temperature region; (2) to improve the critical current carrying capacity of the HTSC elements with the reduction of cross-section area; (3) to improve the thermal stability of the composite lead as an integral whole; (4) to lessen the effects of the self-field on the critical current carrying capacity of the feedthrough composite; and (5) to minimize the disruption of electrical conduction by the potential failure of one or more individual superconductive elements.

The axial ends, which are typically top and bottom in orientation, of the HTSC components are positioned to extend one or more millimeters desirably from the face of the filler material in the integral unit in order to increase the surface area of electrical contact of the HTSC elements individually. The top and bottom axial ends of the superconductive elements are preferably metalized or cleaned and polished in preparation for electrical joint attachment in the intended assembly or apparatus which is the place or circumstance of intended usage and function.

Before describing the details of an assembly or apparatus into which the composite lead is typically placed in order to function at maximum benefit and advantage, it is both useful and necessary to recognize the wide range and diversity of the minimal and essential component parts comprising the composite lead which is the subject matter as a whole of the present invention.

A. The Superconductive Elements:
High Transition Temperature Superconductors

As regards superconductive materials, a wide range of substances including refractory oxide compositions, metallic alloys, and atomic elements have recognized properties which identify them as superconductive compositions. A representative, but incomplete, listing is provided by Table 1 below.

TABLE 1

| Superconductive Composition | Name | $T_c$ (range, K) | Published Reference |
|---|---|---|---|
| Refractory oxide ceramics | yttrium barium copper oxides ($YBa_2Cu_3O_{7-x}$) BiSrCaCuO TlBaCaCuo | up to 93 up to 110 | # |
| Alloys | $Nb_3Al_{0.8}Ge_{0.2}$ | 20.1 | * |
| | $Nb_3Sn$ | 18.1 | * |
| | $Nb_3Al$ | 17.5 | * |
| | $Nb_3Au$ | 11.5 | * |
| | $Nb_3N$ | 16.0 | * |
| | MON | 12.0 | * |
| | $V_3Ga$ | 16.5 | * |
| Elements | Al | 1.2 | * |
| | Cd | 0.5 | * |
| | Ga | 1.1 | * |
| | In | 0.1 | * |
| | La ( ) | 4.8 | * |
| | La ( ) | 4.9 | * |
| | Pb | 7.2 | * |
| | Hg ( ) | 4.2 | * |
| | Hg ( ) | 4.0 | * |
| | Mo | 0.9 | * |
| | Nb | 9.3 | * |
| | Os | 0.7 | * |
| | Rh | 1.7 | * |
| | Ru | 0.5 | * |
| | Ta | 4.5 | * |
| | Tc | 8.2 | * |
| | Tl | 2.4 | * |
| | Th | 1.4 | * |
| | Sn | 3.7 | * |
| | Ti | 0.4 | * |
| | W | 0.01 | * |
| | U ( ) | 0.6 | * |
| | U ( ) | 1.8 | * |
| | V | 5.3 | * |
| | Zn | 0.9 | * |
| | Zr | 0.8 | * |

*M.A. Omar, Elementary Solid State Physics: Principles and Applications, 1975, p 499.
Wu et al., Phys. Rev. Lett. 58:905 (1987).
Chu et al., Phys. Rev. Lett. 60:941 (1988); and Dai et al., Intern. J. Mod. Phys. B3:77 (1989).

It will be recognized and appreciated, however, that certain kinds of refractory ceramic oxides have been developed in recent years which constitute "high transition temperature superconductors" and that these are most desirable for use in the present invention. The utilization and deployment of HTSC materials in large current applications will depend in large part upon the electric interface resistance of the HTSC materials with each other, with other superconductors, and with normal metals. It is expected and presumed that all conventionally available knowledge and effort will be employed to minimize and reduce the contact electrical resistance in all interfaces and junctions with the composite lead of the present invention.

The Electrical and Thermal Differences Between HTSC Materials and Standard or Normal Electrical Conductors A major consideration in the construction of an electrical feedthrough or junction between nitrogen and helium temperatures is the need to minimize the total conductor resistance in order to minimize Joule heating due to resistive dissipation in the conductor; and the need to minimize the total thermal conductance in order to reduce the leakage of heat into the helium temperature region through the lead. Among the standard or normal conductors typically and conventionally used for transmission of current into cryostats are constantan, stainless steel, and copper. It will be shown below (see Table 4 for a summary) that a superconductor composed of HTSC will outperform a normal conductor having the best electrical and thermal conduction properties of the standard conductors.

It is an unfortunate fact that the electrical conductivity and the thermal conductivity of the standard conductors are strongly coupled so that the better electrical conductor generally has the better thermal conductivity. This fact makes the simultaneous achievement of the goals stated above for the standard conductors impossible in practice.

To show that HTSC materials are preferable over standard conductors, the design and performance parameters for a best-case conductor which combined the best electrical conductivity of the above standard conductors with the worst thermal conductivity are directly compared and evaluated. Table 2 shows the resistivities of the standard conductors at various temperatures. The value for yttrium barium copper oxide (YBCO), the most studied and most available of the HTSC, is added for reference and comparison.

TABLE 2

| | Resistivities of Conductors Commonly Used in Cryogenic Applications (micro-ohm-cm) | | | |
|---|---|---|---|---|
| | 295K | 90K | 77K | 4K |
| Copper | 1.69 [2] | | 0.23 [3] | 0.01 [3] |
| Constantan | 53 [2] | 45 [2] | | 44 [2] |
| Stainless steel | 71 [2] | 53 [2] | | 49 [2] |
| YBCO | | | $<2 \times 10^{-12}$ [5] | $<2 \times 10^{-12}$ [5] |

Table 2 shows that copper is by far the best conductor of the standard conductors shown. Assuming that all of the conductors evaluated here operate between the same temperatures and are of the same length, the only dimensional parameter of the conductor which can be freely chosen is the cross-sectional area. The cross-sectional area to be used is determined by the current which will be carried by the conductor. By calculation, for a current of 100A at room temperature, a copper wire must have a diameter of 289 mils or 0.734 cm; and the cross-sectional area of the wire is then 0.423 cm$^2$. Using the best value of the conductivity of copper of 0.01 micro-ohm-cm at 4K., yields a value of 0.0236 micro-ohm/cm for the resistance per unit length of the copper conductor. Assuming a length for the conductor of 40 cm results in a power dissipation of 9.44 mW.

In a conductor composed of YBCO, if account is taken of the expected critical currents in the fields expected at the conductor (see below), a minimum cross-sectional area of 0.2 cm$^2$ is required for a 100A conductor. Meassures of persistent currents in YBCO at nitrogen temperature will yield an upper limit for its resistivity of $2 \times 10^{-12}$ ohm-cm. Using this value and the required cross-sectional area of YBCO yields a value of $1 \times 10^{-11}$ ohm/cm for the resistance per unit length of YBCO. This is a factor of 2360 better that the value for the copper conductor. The power dissipation is 4 uW.

Table 3 shows the average thermal conductivities of the standard conductors. The average thermal conductivity here is the integral average of the thermal conductivity from room temperature to helium temperature.

TABLE 3

The Average Thermal Conductivities of Conductors Commonly Used in Cryogenic Applications (W/cm-K)

| | |
|---|---|
| Copper [1] | 1.60 |
| Constantan [1] | 0.18 |
| Stainless steel [1] | 0.10 |
| YBCO* [6] | $<6 \times 10^{-3}$ ($<77K$) |
| Epoxy | very low |

*The value shown is the least upper bound on the data given in the reference.

Table 3 shows that stainless steel has the lowest thermal conductivity of the standard conductors. Using the thermal conductivity of stainless steel for the hypothetical conductor; and, assuming that it operates between nitrogen temperature and helium temperature with the same cross-section and area as the previously described copper conductor, yields a heat leak of 77.2 mW.

Values of the thermal conductivity have been measured and reported in the literature for YBCO and are less than $6 \times 10^{-3}$ W/cm-K below nitrogen temperature. Thus, the heat leak for the YBCO conductor is 2.3 mW, which is a factor of 33 times less than the thermal heat leak for the hypothetical best-case conductor using the electrical conductivity of copper and thermal conductivity of stainless steel.

A summary of the power dissipation and heat leak for the hypothetical conductor and the YBCO conductor is shown in Table 4. It is seen that the YBCO conductor performs better by a factor of 40 times better than the hypothetical conductor, which combines the high electrical conductivity of copper and the low thermal conductivity of stainless steel. Since the actual standard conductors have much poorer combined characteristics, the YBCO conductor is obviously preferable to a standard conductor for delivering power at the given temperatures and is better by a factor of 40-fold than the combined best characteristics of standard conductors.

TABLE 4

Power Dissipation and Heat Leak for the Best-Case Standard Element and a YBCO Element

| | Joule Heating | Thermal Conduction | Total |
|---|---|---|---|
| Copper | 9.44 mW | 1.24 W | 1.25 W |
| Stainless steel | 0.397 W | 77.2 mW | 0.474 W |
| Hypothetical | 9.44 mW | 77.2 mW | 86.64 mW |
| YBCO element | 4 uW | 2.3 mW | 2.3 mW |

It will be noted that the estimates presented in Table 4 do not include the tapering of the leads which will be possible because of higher critical currents at lower temperatures. They also do not include a thermal anchor at 20K. which may further reduce the heat leak to the 4.5K. reservoir.

Physical Format of the HTSC Elements

Given that the use of HTSC conducting elements results significant reductions in thermal leakage into the 4.5K. temperature region, one should determine and chose the preferred format for the HTSC material comprising the superconductor elements. The formats which are available are: (a) thin films; (b) thick films; and (c) bulk.

In order to choose a suitable and advantageous format from the above, several characteristics of the various formats must be examined. These are the critical current density; the size of the substrate relative to the superconductor; the thermal conductivity and bulkiness of the substrate realtive to the superconductor element; the cost of the element; and finally the availability.

(a) Thin Films

In order to obtain the highest critical current densities, it is necessary to prepare thin films of HTSC. It is possible to obtain critical current densities greater than $10^5$ A/cm$^2$ at 77° K. in thin films of YBCO films. However, other factors limit the utility of thin films in the present application. With typical thin film thicknesses of 0.1 microns and substrate thicknesses of about 0.1 mm, a superconductor element made using YBCO thin films would have a cross-section which was 99.9% substrate and only 0.1% conductor. Additionally, the production of high critical current density thin films requires deposition on special substrates (MgO, SrTiO$_3$, ZrO$_2$) to facilitate grain alignment. The substrate materials are generally expensive and the deposition rates are low limiting large-scale production of thin film conductor elements.

(b) Thick Films

A more promising format for HTSC elements is the thick film. Thick films of YBCO in an organic binder have been screen-printed onto various substrates and annealed to form thick superconducting films. Films of up to 40 microns thickness have been prepared with good superconducting characteristics by others. Thick films of YBCO with 10% weight of silver impregnation yield critical current densities of 3,000 A/cm$^2$ at 77K. and 100A/cm$^2$ at 500 gauss applied magnetic field. Thick films on substrates are therefore seen to result in 100 times more electrical conduction in cross-section than thin films. However, the maximum critical current densities are reduced by at least the same factor from those of thin films. The ease of fabrication of thick films promises much lower production costs than for thin films.

(c) Bulk HTSC

The most common form of HTSC (for example, YBCO) is bulk ceramic oxide sintered powder. Critical current densities as high as 1,100 A/cm$^2$ at 77 K. found in bulk samples are lower than those found in thin films and values of 50 A/cm$^2$ are typical for commercially available samples. The advantage of using bulk HTSC such as YBCO as a superconductor element is the absence of a substrate so that the entire cross-section of the element is composed of electrical conductor and there is no contribution to thermal conduction by a substrate. The disadvantage of bulk YBCO is its stiffness and brittleness. However, the latter disadvantage can be overcome by the use of a suitable potting material. Some improvement in the critical current density and its behavior at low fields has been obtained by packing the YBCO powder into silver tubing; drawing and pressing the tubing into flat ribbons; and annealing in oxygen. Critical current densities as high as 2,000 A/cm$^2$ at zero applied magnetic field and 20 A/cm$^2$ at 200 gauss have been obtained. The tapes are somewhat flexible. The main disadvantage of the tapes in this application is the high thermal conductivity of the silver sheathing. For currently available tapes, this makes up approximately 60% of the cross-section of the superconductor. This sheathing would be minimized for the current application if used or alternative sheathing materials would be used.

Clearly, bulk HTSC is the preferred choice. Table 5 below summarizes the characteristics of the above formats. Moreover, a bulk ceramic oxide HTSC such as YBCO is currently the preferred choice for large scale applications. It has a large enough critical current density that significant currents can be carried in reasonable conductor cross-sections (e.g., 500A in 1 cm$^2$). Bulk YBCO is widely available and less expensive than films. With creative shielding by mu-metal or even HTSC shields, it can maintain its current carrying capacity at moderate ambient magnetic fields. With proper mechanical reinforcement, brittleness and handling problems are reduced significantly. Thus, bulk YBCO or bismuth strontium calcium copper oxide (BSCCO) is the preferred HTSC material.

TABLE 5

Summary of the Characteristics of Various HTSC Conductor Element Formats

|  | Thin Film | Thick Film | Bulk |
| --- | --- | --- | --- |
| Critical current density performance | Best | Moderate | Worst |
| Substrate size | 99.9% | 90% | 0% |
| Degradation of thermal performance by substrate | Most | Moderate | Least |
| Degradation of electrical performance by substrate | None | Some | None |
| Cost of element | High | Moderate | Low |
| Quantities available | Small | Small | Large |

Non-Laminated and Laminated Formats for the HTSC Elements

The HTSC elements may also be alternatively prepared and structured as either non-laminated or laminated structures prior to use and potting with the filler material to form the integral unit. The available variety and choices include: (a) long thin slabs of bulk HTSC; (b) multi-layered laminate thick films; and (c) multi-layered bulk preparations.

(a) Long Thin Slabs of Bulk HTSC: This is the preferred format previously illustrated within FIGS. 1 and 2 and described in detail above. This is clearly the most preferred format for the HTSC material.

(b) Multi-Layered Laminate Thick Films: This format employs thick films of superconductive materials deposited upon a supporting polymeric substrate to form a laminate construction. The preparation of HTSC laminated thick films and the resulting structure and construction is conventionally known and recorded in the scientific literature [Yoshiara et al.]. The purpose and goal is to deposit a thick film of a superconductor such as YBCO onto a suitable substrate; and then deposit a structurally compatible layer of electrical insulator (such as non-superconducting YBCO) upon the laminate as a covering layer. The final product is then an electrically insulated HTSC laminate which is then employed as a single superconducting element within the feedthrough composite. Such multi-layered laminate thick film superconductors will provide low thermal conductivity; be thin films relative to the total element thickness; and be used individually as the superconductive elements spaced from each other coaxially within the encompassing filler material to form the integral unit.

(c) Multi-Layered Bulk Preparations: In order to prepare a bulk HTSC in multi-layered form, the precursor HTSC bulk powder is desirably packed into a shaped die or mold for pressing into a configured pellet of prechosen shape and dimensions—much as a disc or a slab. The bulk HTSC material is packed into the die one layer at a time and pressed to form a sheet. Subsequently, each pressed HTSC layer sheet is then covered with separator particles such as a metal foil which is non-poisonous to the HTSC material. A suitable metal foil separating material is copper foil. Another layer of HTSC powder is then packed into the die and pressed into the thickness of the preparation. Thus, multiple alternating layers of powder HTSC material and separator particles are pressed in succession to form a multi-layered laminated structure. The full laminate preparation is then finally pressed or molded into a prechosen shape and dimension such as a pellet of determinable size and thickness. The pressed pellet representing the multi-layered laminate bulk preparation is then baked and oxygenated in the conventionally known manner to yield a superconducting element. A number of these multi-layered bulk preparations are manufactured individually and employed collectively to provide a plurality of superconductive laminate elements comprising the integral units which is the feedthrough connector.

B. The Electrically Non-Conductive Filler or Potting Material

It will be recognized and appreciated that the filler material comprising the composite lead of the present invention need only demonstrate four minimal properties and characteristics. These four minimal properties are: the filler material is itself electrically non-conductive; the filler material has a low thermal conductivity between 300K. and 4.5K.; the filler material is resistant to the effects of temperature differences from about 300K. to about 4.5K.; and the filler material has a thermal expansion coefficient substantially similar to the thermal expansion coefficient of the superconductive elements utilized in the specific embodiment of the feed through composite.

In addition, there are a number of optional features and attributes of the filler or potting material in preferred embodiments of the present invention. These include: a filler material which is durable and chemically stable over a period of years; a filler material which is relatively impervious to liquids and gases; a filler material which is a polymer and can be prepared as needed and be manipulated with ease and dispatch; and a filler material which is a conventionally known formulation available in commercial quantities for use.

Given the stated range of minimal properties and desirable characteristics for the filler or potting materials, epoxies as a chemical class comprise the most suitable and desirable compositions for use. The epoxies of choice are those used conventionally in low-temperature environments; and include stycast, Scotchcast, epibond, and Araldite. Some epoxy formulations include solids which permit the user to modify and alter the thermal expansion coefficient of the epoxy; and low-viscosity epoxies are believed to be most desirable for general use herein. These epoxies are commercially available; but the scientific and commercial literature provides more than ample knowledge and information for any person of ordinary skill who wishes to prepare his own epoxy formulations for his own use and specified parameters.

Some of the most desirable epoxy formulations which are merely representative of the class membership as a whole, are:

(a) Stycast 1266 (available from Emerson and Cuming, Canton, Mass. 02021) which is strong, transparent, has a low viscosity in fluid state, is easily machinable, and bonds well to most metals. It has the disadvantage of a rather large thermal expansion coefficient (1.5% change in linear dimension on cooling to 4K.), and can only be made in rather small batches (<100 g), as the exothermic reaction involved in curing causes thermal runaway in larger castings. Stycast 1266 comes initially as two parts of clear liquid, but one part sometimes becomes a pasty white material on storage. It may be restored to original form by heating to 70–80C. for a few minutes.

(b) Stycast 1269 (same manufacturer) has similar mechanical properties, and lower dielectric loss. It may be made in large batches, but requires a cure at elevated temperatures, which is not convenient in many circumstances.

(c) Stycast 2850FT and GT (same manufacturer) are a black epoxy resin filled with silica powder to give a lower thermal expansion coefficient matched roughly to copper (FT) or brass (GT). The resulting material is very strong, adheres well to metals (better than 1266 or 1269), and tolerates brief exposure up to 200C. for soft soldering nearby. Unfortunately, it is essentially unmachinable, has a non-negligible magnetic susceptibility, and a temperature-dependent dielectric constant at low temperatures, and at room temperature is vastly more viscous prior to curing. (Using Catalyst II for elevated cure at 100–125C. gives very acceptable properties to the liquid form if the casting is done with the resin preheated to 80C. or so). Stycast 2850 is very much more reliable for making seals to niobium than is Stycast 1266. 2850 appears to adhere better to metals an general than does 1266, and on larger diameter joints between an epoxy chamber and a metal part, it can be utilized effectively as an intermediate glue, in a layer 1 or 2 mm thick.

All of the above epoxies may be removed with the strippers Ecostrip 93 or 94; and the Stycast 1266 and 1269 epoxies can be cut away with the judicious use of a hot soldering iron. All of these epoxies will be attacked by various organic solvents over a period of hours to weeks—some examples being acetone (which acts slowly and is fine for short-term cleaning off of pieces) and methylene chloride (which acts considerably faster). The epoxies are only weakly attacked by concentrated acids and appear impervious to strong bases. A useful fabrication technique is to create a mold from aluminum, which can be machined with a very smooth surface to high precision; cast epoxy in or around it; and then later etch away the aluminum with concentrated NaOH. Very precise and delicate structures have been made in this way.

(d) Another epoxy finding frequent use because of speed of curing is a 5 minutes epoxy made by Hardman, Inc., Belleville, N.J. 07109. This has mechanical properties rather inferior to those of Stycast 1266, but does have a great convenience advantage in non-critical applications (or even sealing between parts of imperfectly matching forms, or on corners of joints being made with 1266 as the really functional epoxy).

(e) In the same vein of higher speed, Eastman 910 or any of the myriad other cyanoacrylate adhesives offered by other manufacturers is very convenient, very fast, and strong in thin layers between clean surfaces. It cycles reasonably well to low temperatures.

IV. THE ASSEMBLY AND ARRANGEMENT IN WHICH THE COMPOSITE LEAD WILL BE USED

It is envisioned and expected that the composite lead of the present invention will be positioned in a purposefully prepared assembly and arrangement which conveys electrical current through three distinct temperature environments—a 75–80K. region, a 20–25K. region, and a 0–5K. region. A preferred arrangement and assembly as well as an alternative apparatus is disclosed below.

A. The Preferred Arrangement and Assembly

Figure 3:
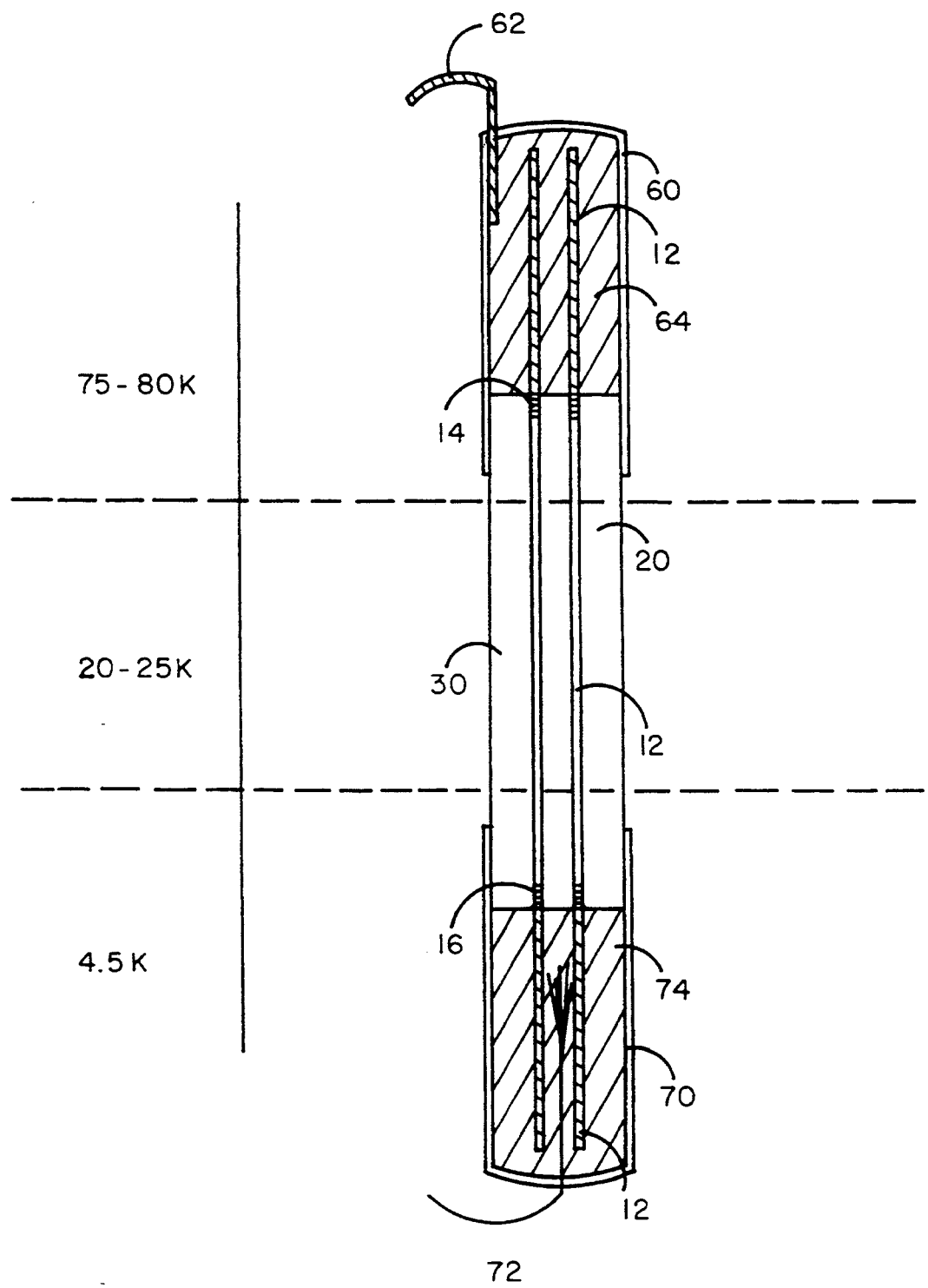
FIG. 3 is a view of a preferred arrangement and assembly using the composite lead of FIG. 1.

A preferred arrangement and a preferred assembly for the feed through article or composite lead able to carry electrical current at 100 amperes from 300K. to 4.5K. is illustrated by FIG. 3 in which the composite lead (previously described herein and shown by FIG. 1) is positioned within a holding chamber or spatial zone which provides a liquid helium reservoir or bath having a temperature of 4.5K. or less. The orientation and positioning of the composite lead 10 is such that the first axial end 14 lies within the 75–80K. temperature region forming the top of the chamber; the extended axial body 18 lies within the center of the chamber forming the 28–25K. temperature region; and the second axial end 16 is immersed in liquid helium at a temperature of 4.5K. or less which lies at the bottom of the chamber. The different temperature regions or zones within the interior of the holding chamber are formed and maintained as a consequence of the liquid helium being kept at 4.5K. or less. This occurs because a helium vapor over the liquid helium bath is formed and released from the chamber bottom; and the helium vapors will inevitably rise to the top of the holding chamber, thereby cooling the interior spatial volume of the chamber from the bottom to the top during the progress of the vapors' migration. In this manner, despite the absence of foils, walls, baffles, bellows, or other physical obstacles or obstructions within the interior spatial volume of the holding chamber, the three distinct temperature regions of 4.5K., 20–25K., and 75–80K. are created and maintained.

Prior to placement within the intended 75–88K. temperature region of the holding chamber, a first metal cap 60 and normal electrical lead 62 is positioned over and around the first axial end 14 and the superconductive elements 12 of the composite lead 10. As shown by FIG. 3, this first metal cap 60 is preferably cylindrical in overall configuration; is hollow in design and dimensioned to fit tightly over the first axial end 14; is composed of a normal electrical conductor such as copper; and includes an aperature through which a liquified low temperature soldering alloy 64 (such as described within U.S. Pat. No. 4,966,142) has been introduced and used to fill the internal void spatial volume between the superconductive elements 12 and the first metal cap 60. In this manner, a solid and secure electrical juncture is made and maintained between the first axial end 14 of the composite lead 10 and the normal electrical conductor at the intended 75–80K. temperature region—which is itself in electrical communication with the ambient environment at about 20C.

Similarly, prior to immersion within the 4.5K. liquid helium bath, a second metal cap 70 with superconductive filaments 72 (such as NbTi) is positioned over and around the second axial end 16 and the superconductive elements 12 of the composite lead 10. As appears in FIG. 3, this second metal cap 70 is also preferably cylindrical in overall configuration; is also hollow in design and dimensioned to fit tightly over the second axial end 16; is composed of an electrical conductor such as copper; and also includes an aperature through which a liquified low temperature superconducting alloy 74 (such as described within U.S. Pat. No. 4,966,142) has been introduced and used to fill the internal void spatial volume between the superconductive elements 12 and the second meal cap 70. In this manner, a solid and secure superconducting electrical juncture is made and maintained between the second axial end 16 of the composite lead 10 and the superconductive filaments 72 to be held at 4.5K. temperatures by the liquid helium bath.

B. An Alternative Arrangement and Assembly

The Apparatus

It is envisioned and expected that the composite lead of the present invention will be positioned within an alternative assembly or arrangement which transmits an electrical current through three distinct temperature environments; and optionally includes an apparatus having four primary portions or parts. The three distinct temperature environments as well as the four primary assembly parts are schematically illustrated by FIG. 4.

Figure 4:
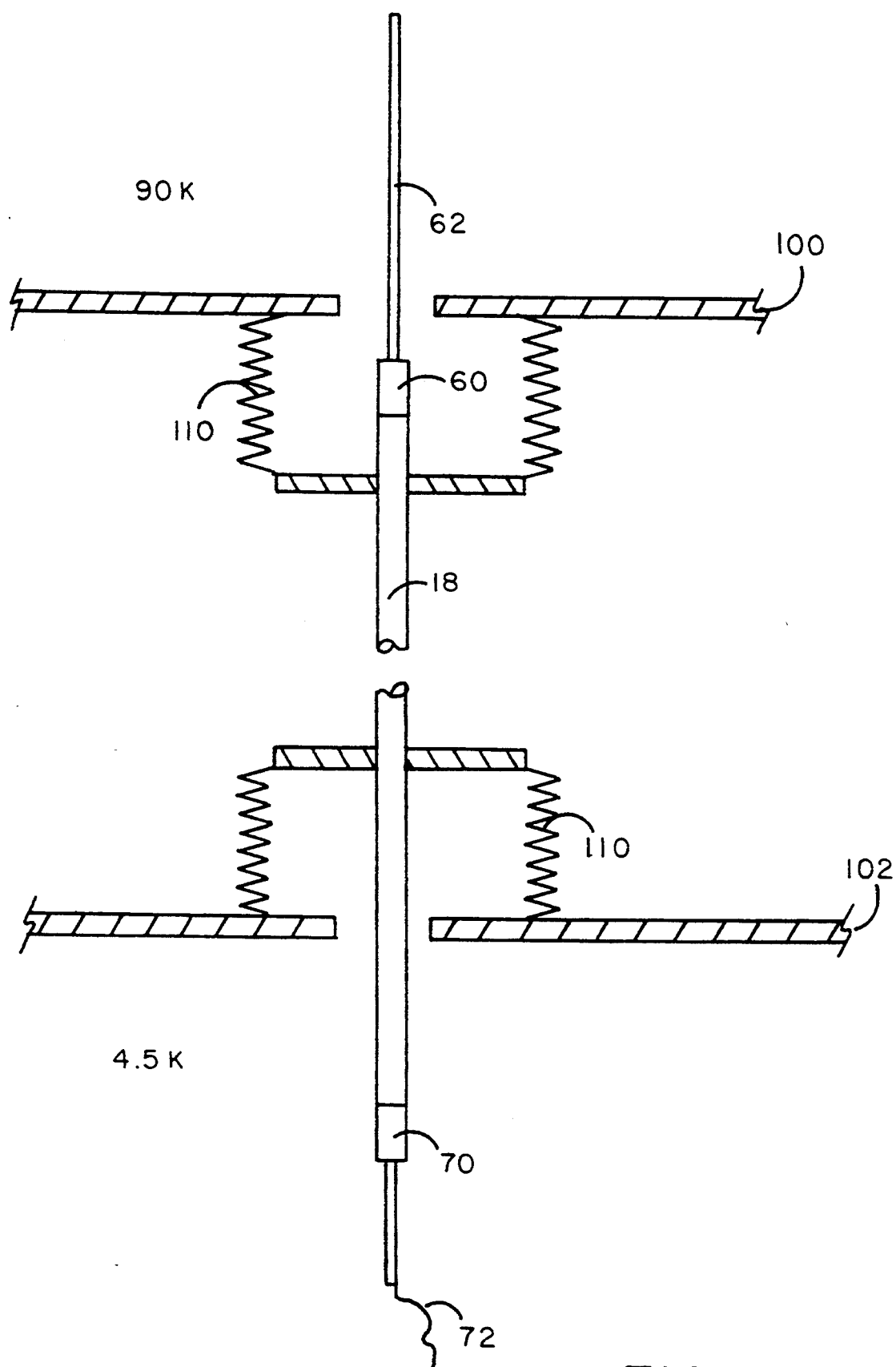
FIG. 4 is an organization diagram of an alternative assembly used with the composite lead of FIG. 2.

With reference to the organizational diagram provided by FIG. 4, copper leads will carry electrical current at 100 amperes from room temperature (300K.) into a 75-80K. temperature region of a holding chamber. The conventional copper lead is itself attached to the plurality of composite leads, each of which has a first axial end extending outwardly from the face of the integral unit. The copper lead is electrically joined and physically attached to the superconductive elements 12 directly which are present within the chamber in the 75-80K. temperature region. The extended axial body 18 of the feedthrough composite lead 10 itself then passes from the 75-80K. temperature region into a prepared vacuum space and apparatus at about 20-25K. which physically separates the 75-80K. temperature environment from the 4.5K. temperature region provided by liquid helium. The axial body length of the composite lead then passes from the 20-25K. vacuum area directly into the 4.5K. liquid helium environment via the second axial end 16 of the superconductive elements 12 individually comprising the feedthrough composite lead. This second axial end 16 of each composite lead 10 is attached physically to the low temperature superconducting magnet leads (typically composed of NbTi) which are anchored within the 4.5K. temperature environment. Each composite lead thus has one axial end physically connected and electrically joined to copper leads from 300K. current sources; while the other axial end is physically joined and electrically in communication with the low temperature superconducting magnet leads anchored within a 4.5K. liquid helium temperature environment.

By the alternative assembly illustrated by FIG. 4, the four primary apparatus parts therefore are: the existence and placement of at least one composite lead comprising the present invention; the physical apparatus providing a vacuum space and a temperature gradient between the 80K. temperature region and the 4.5K. temperature environment; the manner and existence of the electrical junction between the normal copper leads within the 80K. temperature environment and the first axial ends of the superconductive elements comprising the composite lead; and the physical linkage and electrical juncture between the superconducting magnet leads at 4.5K. and the second axial ends of superconductive elements comprising the composite lead in this 4.5K. temperature environment.

The composite lead used in this assembly is that which has been previously described herein and is illustrated by FIG. 2. In order to facilitate thermal contact with the 75-80K., 20K., and 4.5K. temperature environments, the copper foils previously embedded in the epoxy filler material of the composite lead lie extended and in a plane perpendicular to the linear axis of the composite itself within the assembly. Tabs from the copper foils (not shown) will be thermally anchored to straps originating within the various temperature regions. This organizational arrangement is believed to be better suited to those applications where cooling takes place by cryogenic circulation through pipes rather than the immersion of various components within a cryogenic liquid such as helium. This arrangement and organizational scheme will also prevent the loss of helium gas from the circulating coolant at the 4.5K. temperature region.

As illustrated schematically by FIG. 4 hereof, it is sometimes desirable that a distinct region and volumetric space be walled off in order to separate the 80K. temperature environment at the top of the chamber from the 4.5K. temperature region at the bottom of the chamber. To achieve this goal and purpose, it is preferable that such an apparatus be constructed which provides a plurality of reinforced, temperature-resistant walls and includes a specific volumetric space between the temperature segregating walls which are to be evacuated by mechanical pumps (or otherwise) to provide a vacuum. One apparatus suitable for providing both the temperature segregating walls and the internal vacuum space between the 80K. temperature environment and the 4.5K. temperature region is illustrated by FIG. 5.

Figure 5:
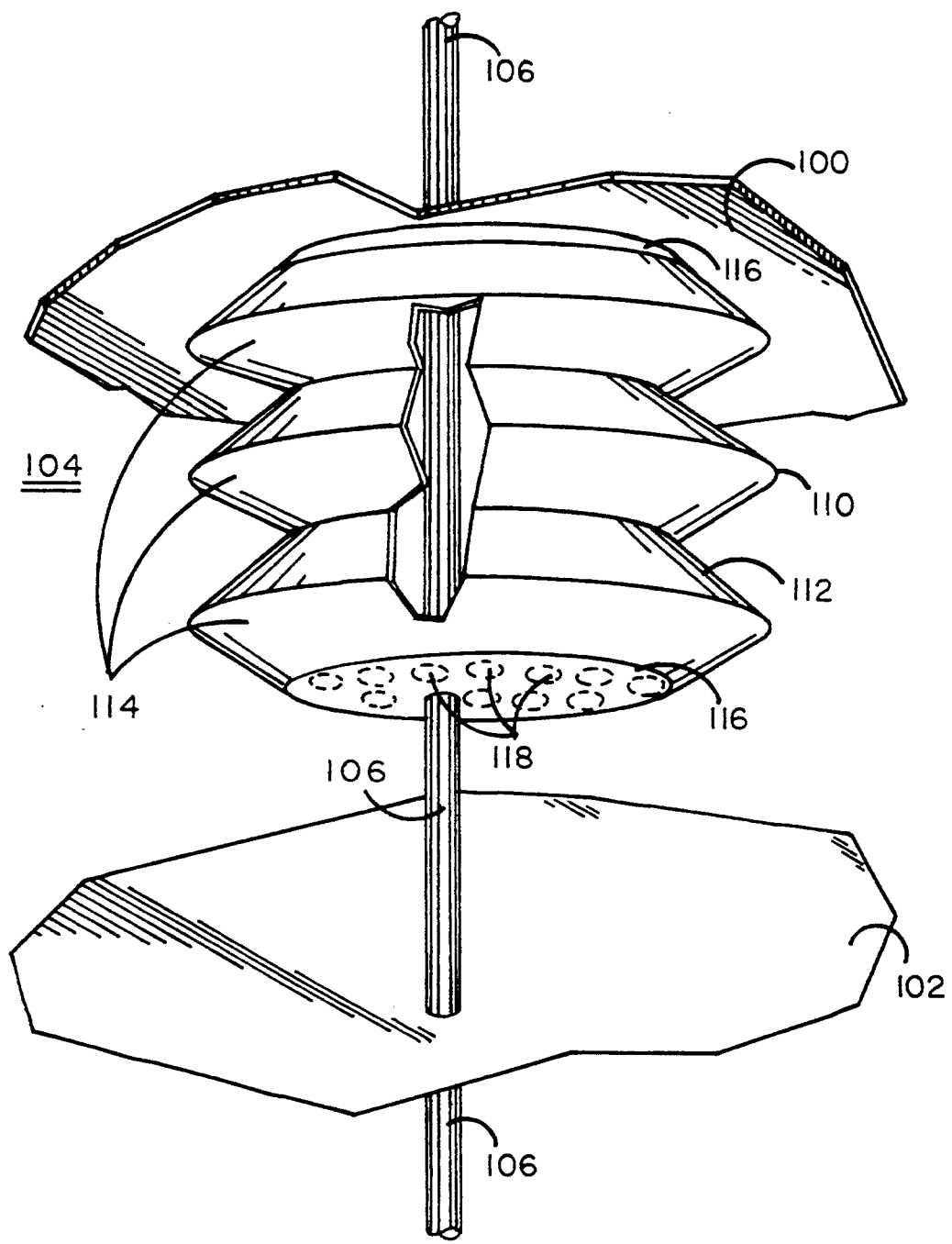
FIG. 5 is a representation view of a bellows apparatus within the alternative assembly illustrated by FIG. 4.

As shown by FIG. 5, the apparatus comprises a first temperature segregating wall 100 and a second temperature segregating wall 102. The wall 102 segregates the internal vacuum space 104 from the 80K. temperature region while the wall 102 segregates the internal vacuum space 104 from the 4.5K. temperature environment. Within the vacuum space 104 is a bellows 110 through which the axial body and length of the composite lead 106 pases. The bellows 110 is itself comprised of a bellows base 112; the inflatable and compressible bellows folds 114; and desirably includes a pair of bellows faces 116 which are tightly fitted into the flange (not shown) disposed upon the axial length of the composite lead 106. A vacuum is maintained of at least $10^6$ torr by mechanical means (diffusion pump, turbo pump, or ion pump) conventionally known within the vacuum space 104. In addition, a plurality of holes or aperatures 118 exists in the bellows faces 116 for passage of each composite lead 106; and it is the metal flanges previously potted into the composite lead itself (as shown in FIG. 2) which provide a sturdy mounting for the composite leads through the bellows and allows for thermal expansion and contraction of the composite leads as they link the 80K. temperature environment with the 4.5K. temperature region.

In addition, since external magnetic fields significantly are known to reduce the current carrying capacity of the feedthrough conductor substantially, one or more magnetic shields (not shown) may be placed and used to surround the feedthrough composite passing through the bellows. These magnetic shields may be composed of mu-metal foil or be high transition temperature superconductive materials themselves.

In addition, because the critical electrical current density of the composite lead will increase with decreasing temperature, the cross-sectional area of the composite lead required to carry a given electric current will decrease as the leads approach helium temperature. This phenomenon and occurrence will allow the tapering of the superconductive elements themselves in shape and dimensions as they approach ever closer to the 4.5K. temperature environment; and also concomitantly decrease the heat leakage from the warmer temperature regions toward the 4.5K. environment.

It will be noted and appreciated that the general purpose and practical goal of the present invention—regardless of which embodiment is employed and without regard to the arrangement or assembly in which the composite lead is placed—is to provide a feedthrough article which conveys electrical current from room temperature to helium temperature. The feedthrough composite leads thus should have: (a) a low Joule heating capacity not only within the integral unit but also at the electrical joints to which the axial ends are connected; (b) a low total thermal conduction between the disparity of temperature regions and environments; and (c) a mechanically and electrically reliable construction. Moreover, preferred embodiments will employ 6–12 pairs of composite leads concurrently, each of which is individually capable of electrically carrying 100 amperes. Typically, by the schematic organization and apparatus construction illustrated by FIGS. 3 and 4 respectively, each composite lead will typically pass through a 3 inch (7.5 cm) space in diameter; will be typically 10 inches (25 cm) in axial length; and will operate in an external field of 200 gauss. Moreover, while one representative assembly and appparatus is envisioned to contain six pairs of composite leads, each individually conducting electric current between 75–80K. and 4.5K., it will be clearly understood that this is merely one desirable arrangement of the assembly. For practical purposes, however, it will be recognized and understood that there are no physical, electrical, or mechanic restrictions or considerations which limit the environment wit which the essential features of one or more feed through composites can be usefully employed; the environment in which they are to be placed for effective use; or true number of individual feed through composites cumulatively employed in one or more assemblies so long as effective electric communication is maintained between room temperature and helium environments.

Electrical Juncture and Physical Linkages

Figure 6:
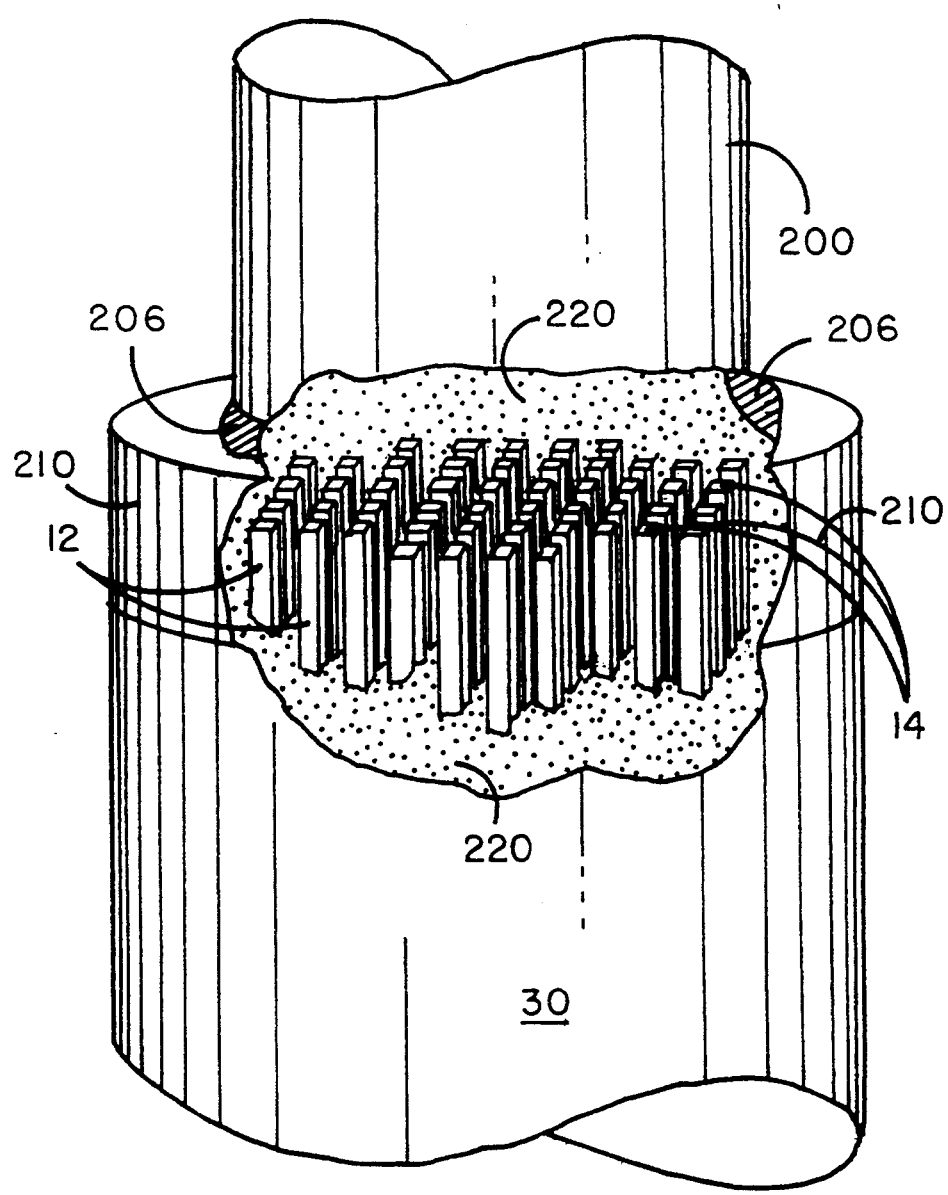
FIG. 6 is a cut-away view of the electrical junction for the composite lead within the 75–80K. temperature region.

The mode and manner of physical linkage and electrical junction in the alternative arrangement and assembly between first axial ends of the composite lead and the normal copper leads in the 75–80K. temperature region are illustrated by FIG. 6. As shown therein, a joint is made between the normal copper lead 200 and the first axial end 14 of each superconductive element 12. This junction (which will be maintained at about 75–80K. by a cryogenic system) provides the electrical linkage and communication between the composite lead of FIG. 2 and the normal leads coming from a room temperature environment. The normal leads are formed of copper; are chosen to minimize thermal conduction from room temperature into the 80K. temperature region; and carry the electrical current from the electrical source at ambient temperature. The copper lead is itself soldered using conventional solder alloys 206 and soldering methods to a mortised copper plate 210 which will engage the first axial ends 14 of the superconductive elements 12 individually.

The mortised copper plate 210 is prepared in advance as follows. The plate 210 is dimensioned to fit the cross-sectional area provided by the first axial end of the feed through composite; and is mortised on one face to receive the individual first axial end 14 of each superconductive element 12 protruding from the face of the integral unit. Preferably, the mortised face of the copper plate 210 is 1.5 centimeters thick. Once the mortised face engages the first axial ends of the superconductive elements individually, the entirety of the copper plate 210 is then soldered to the superconductive elements 12 in the following manner. The copper plate 210 is first heated uniformly to the melting temperature of a low temperature soldering alloy (such as those described within U.S. Pat. No. 4,966,142). The heated copper plate 210 is then tinned and filled with the low temperature soldering alloy 220 on the mortised face. The first axial end 14 of the superconductive elements 12, which have been previously metalized with the low temperature melting solder, are then brought into physical contact with the heated copper plate; brought to the melting temperature of the soldering alloy 220 within the heated plate; and then inserted into the mortises of the heated copper plate filled with a low temperature soldering alloy. The heat is then removed from the copper plate; and the formed joint is allowed to cool. The physical joint is then desirably encapsulated in a non-conductive filler material (not shown), preferably epoxy, in a similar fashion to that previously described herein when making the feedthrough composite in order to ensure both mechanical strength and electrical reliability for this electrical junction.

Figure 7:
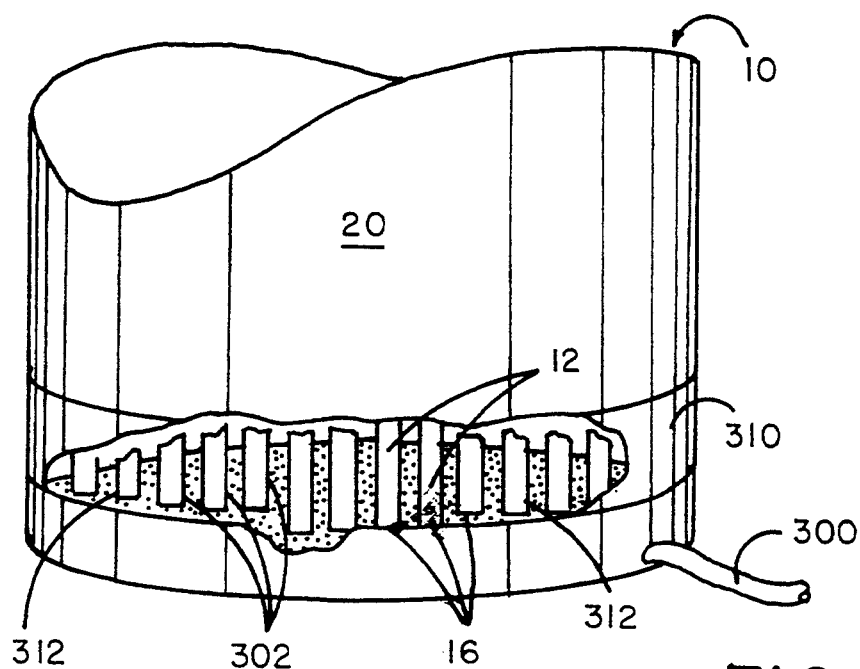
FIG. 7 is a cut-away; view of the electrical junction for the composite lead within the 4.5K. temperature region.

At the other axial end of each composite lead extending through the assembly are the individual second axial ends 16, each of which are to be physically linked and electrically joined at 4.5K. to a low temperature superconductor, typically a composite NbTi-copper superconducting magnet wire. As shown by FIG. 7, the mode and manner of juncture is as follows: the copper cladding 300 is first removed from the magnet wire using a nitric acid solution to expose the NbTi filament end 302; and a copper plate 310 having a mortised face is prepared, heated, tinned, and filled with a low temperature soldering alloy 312 in a manner similar to that described for the mortised plate at the 80K. junction point described previously herein. The low temperature soldering alloy 312 used at this 4.5K. joint is preferably one described within U.S. Pat. No. 4,966,142—which is itself superconducting; and provides a very low electrical resistance interface contact with the NbTi strand ends. In this way, the Joule heating at this low-temperature joint is substantially reduced. The bared NbTi strand filaments 302 are then flared, tinned, and pressed against the mortised face of the copper plate 310; and in this manner, brought to the temperature of the heated copper plate. Similarly, the second axial ends 16 and the superconductive elements 12 comprising the composite lead are also physically pressed against the surface of the heated copper plate 310 and thereby brought to its elevated temperature. Then, the second axial ends 16 of the superconductive elements are themselves carefully inserted into the mortises of the heated copper plate filled with soldering alloy thereby sandwiching the NbTi strands between themselves and the copper plate. This formed joint is then allowed to cool; and is then potted in a filler material (not shown), preferably epoxy, to insure the mechanical strength and electrical reliability of the formed joint at 4.5K.

V. EXPERIMENTAL EXAMPLES AND EMPIRICAL DATA DEMONSTRATING THE VALUE OF THE FEEDTHROUGH COMPOSITE

To demonstrate the range and variety of the feedthrough composite of the present invention, some illustrative experiments are provided which demonstrate the characteristics and properties of the subject matter as a whole which is the present invention. While the experimental design and described empirical results are limited, it will be expressly understood that these details do not either restrict the construction modes available or limit the nature and diversity of the composed parts employed in any meaningful way. To the contrary, these empirical results and experiments are merely representative of the character and diversity for feedthrough composites which can be advantageously prepared and usefully employed.

Figure 8:
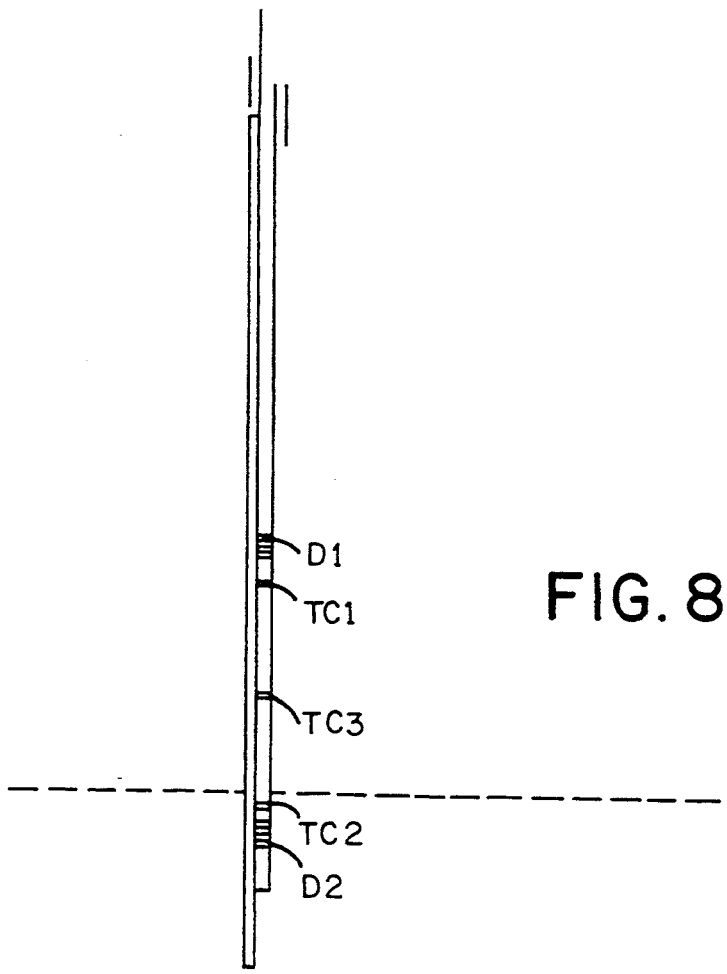
FIG. 8 is a perspective view of the experimental apparatus used to test and empirically evaluate the composite lead of FIG. 2.
Figure 9:
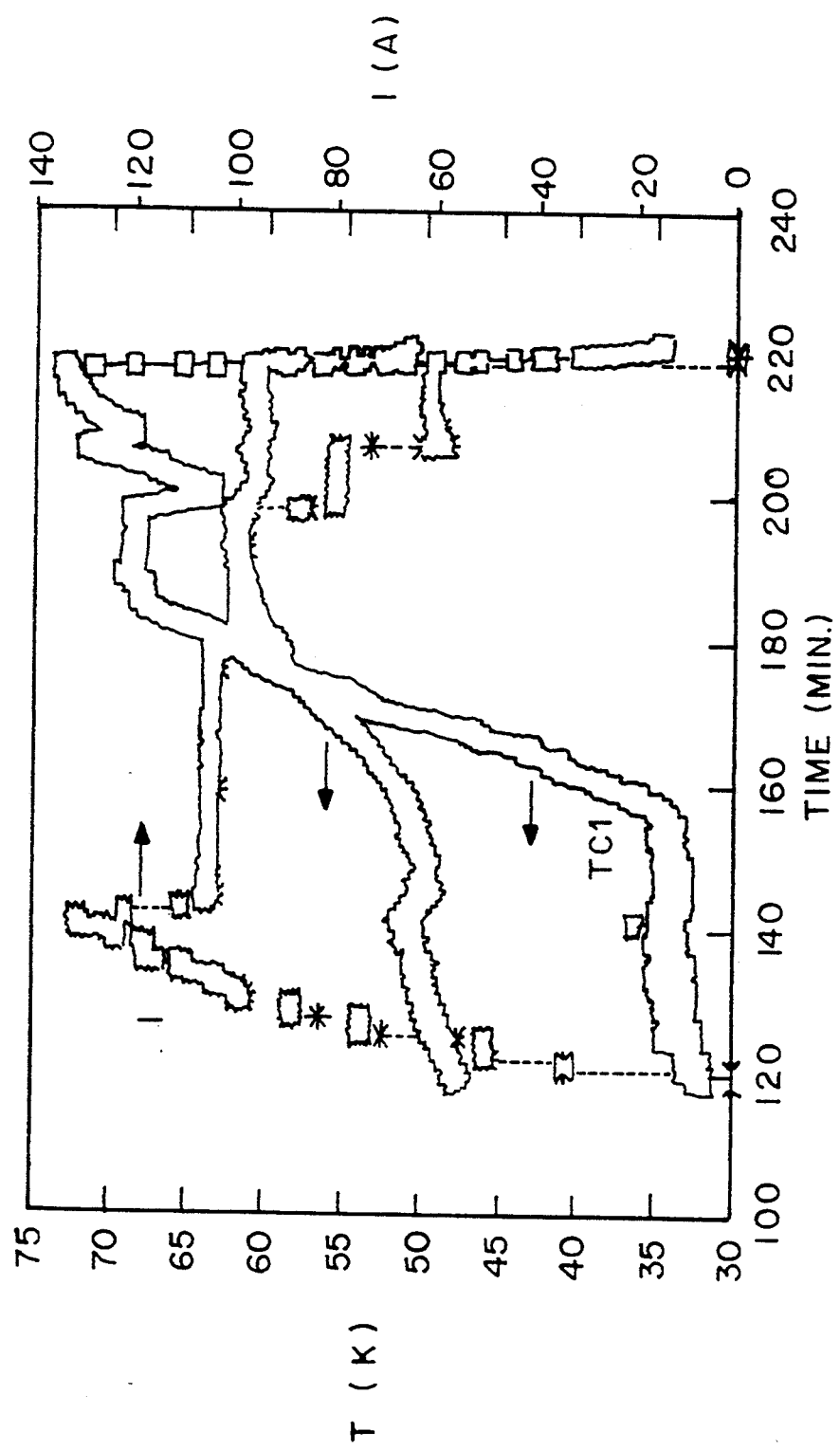
FIG. 9 is a graph illustrating the temperature stability of the electrical juncture at 75–80K. as a function of current for the composite lead of FIG. 8.

As seen in FIG. 8, a DT-470 diode thermometer (D1) was mounted on the outside of the top copper cap. This is the cap which contains the solder joint to the high temperature (75-80K.) ends of the YBCO rods. There is also a voltage tap (V1) soldered to this cap. A resistive heater is wrapped around the cap. A type-T thermocouple (TC1) is imbedded in the epoxy of the feedthrough composite near the top joint to monitor the temperature inside the composite. A thermocouple (TC3) is imbedded about half way between the high temperature and low temperature end of the composite. A thermocouple (TC2) is imbedded near the low temperature end (4.5K.) of the composite. A DT-470 diode (D2) is mounted on the outside of the copper tube containing the low temperature solder joint to the YBCO rods and a voltage tap (V2) is potted directly into this joint.

It will be recognized that this experimental apparatus and design provides a variety of information. The sample voltage reported is the difference, V1-V2. The sample current is measured by reading the voltage between two taps on the external current supply leads. The sample power reported is the product of this voltage and current. These empirical data are given by FIGS. 9-12 respectively.

The sample voltage and maximum temperatures as a function of electrical current are illustrated by FIG. 8 which shows the temperature stability of the high temperature electrical joint under varying lead currents. Note that from 120 minutes to 160 minutes the joint is self-heating and exhibits only a negligible temperature rise. At 160 minutes, heater power is applied to the top joint to raise the temperature to the normal intended operating value of 70K.

Figure 10:
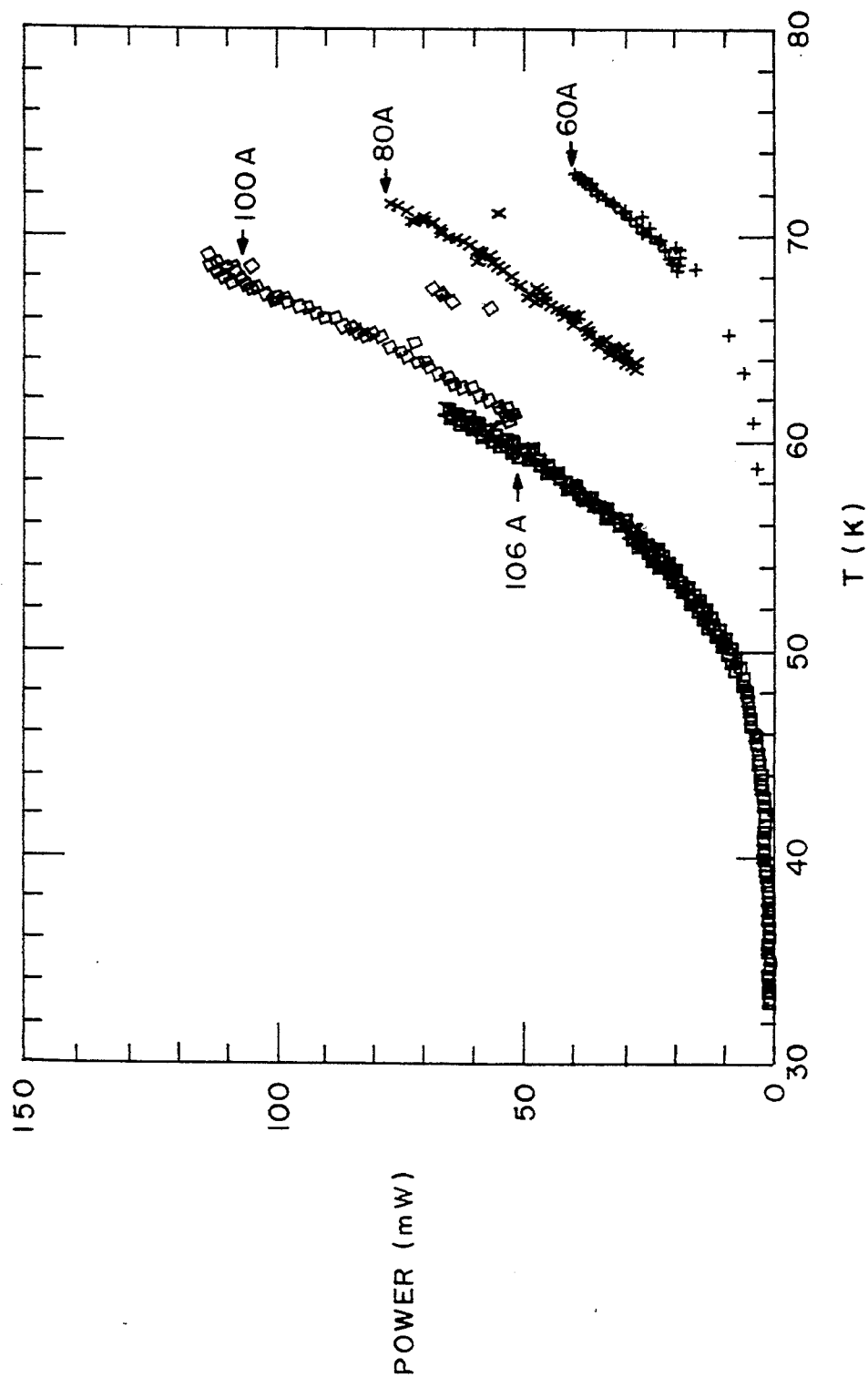
FIG. 10 is a graph illustrating the power dissipation of a 100A composite lead as a function of temperature at various operating currents.
Figure 11:
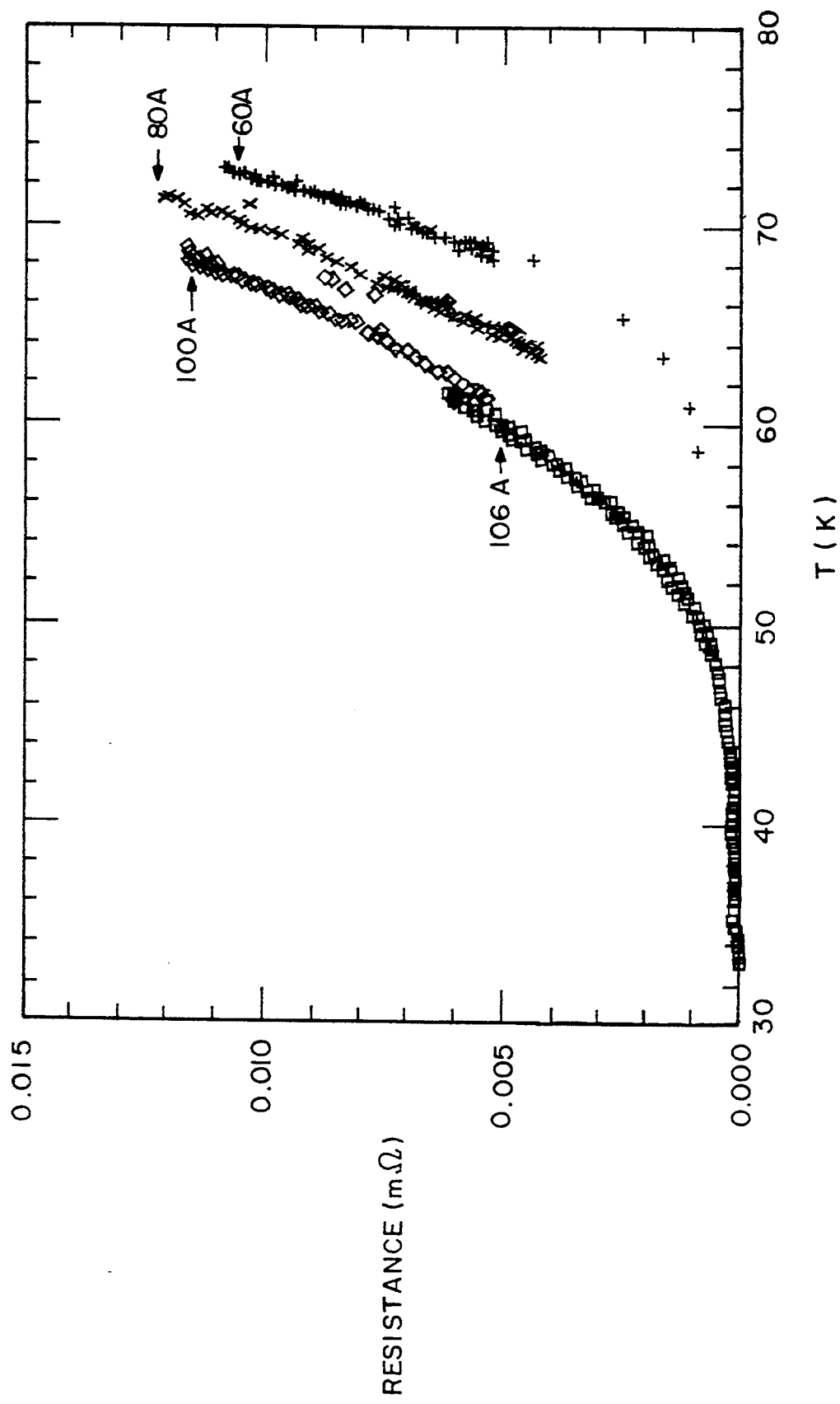
FIG. 11 is a graph illustrating the total resistance of a 100A composite lead as a function of temperature and various operating currents.
Figure 12:
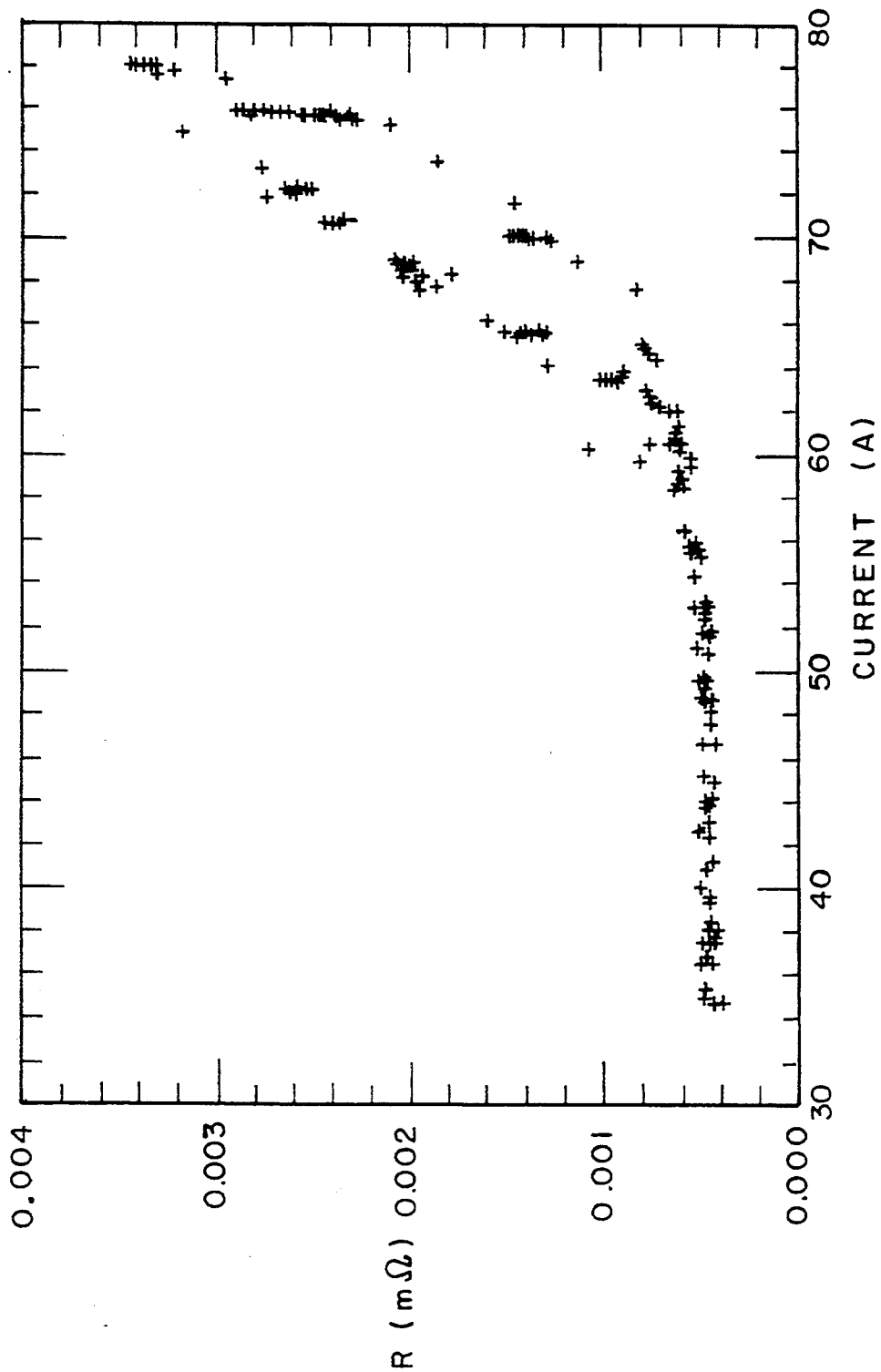
FIG. 12 is a graph illustrating the total resistance of a 100A composite lead as a function of operating current at a temperature of 60K.

FIG. 10 demonstrates the power dissipation of a 100A composite lead as a function of temperature at various operating currents. In comparison, FIG. 11 shows the total resistance of a 100A composite lead as a function of temperature for various operating currents. Finally, FIG. 12 reveals the total resistance of a 100A composite lead as a function of operating current at a single temperature held at 60K. The data of this graph illustrates what is believed to be "flux creep" effects in the HTSC elements leading to exponential increases in resistance at or near the normal operating temperature for the composite lead.

The present invention is not to be limited in scope nor restricted in form except by the claims appended hereto. What we claim is:

1. A composite lead assembly for conducting an electrical current between temperatures from about 75-80K. to about 4.5K., said composite lead assembly comprising:
    a composite lead comprised of
    a plurality of discrete superconductive elements of determinable dimensions and configuration which are spaced co-axially along their lengths from one another, each of said co-axially spaced elements having first and second axial ends and an axially extended body, and having a determinable thermal expansion coefficient, and being comprised of at least one high transition temperature superconductor,
    an electrically non-conductive filler material covering and encapsulating each of sa id co-axially spaced superconductive elements over most of said axially extended bodies without covering said first and second axial ends to form an integral unit, said filler material being resistant to the effects of temperature differences from about 75-80K. to about 4.5K. and having a thermal expansion coefficient substantially similar to said thermal expansion coefficient of said superconductive elements;
    at least one thermally conductive member embedded within and extending externally from said filler material of said integral unit;
    flange means disposed upon said filler material of said integral unit; and
    a vacuum bellows of suitable configuration and internal volume for housing said integral unit in a vacuum environment, said integral unit being held within the internal volume of said vacuum bellows by said flange means.

2. A composite lead for conducting an electrical current between temperatures from about 75°-80° K. to about 4.5° K., said composite comprising:
    at least one discrete superconductive element of determinable dimensions and configuration, said superconductive element having first and second axial ends and an axially extended body, and having a determinable thermal expansion coefficient, and being comprised of at least one high transition temperature superconductor;
    an electrically non-conductive filler material covering and encapsulating said superconductive elements over most of said axially extended body without covering said first and second axial ends to form an integral unit, said filler material being resistant to the effects of temperatures differences from about 75°-80° K. to about 4.5° K. and having a thermal expansion coefficient substantially similar to said thermal expansion coefficient of said superconductive element; and
    at least one thermally conductive foil embedded within and extending externally from said filler material of said integral unit.

3. A composite lead for conducting an electrical current between temperatures from about 75°-80° K. to about 4.5° K., said composite comprising:
    at least one discrete superconductive element of determinable dimensions and configuration, said superconductive element having first and second axial ends and an axially extended body, and having a determinable thermal expansion coefficient, and being comprised of at least one high transition temperature superconductor;

an electrically non-conductive filler material covering and encapsulating said superconductive elements over most of said axially extended body without covering said first and second axial ends to form an integral unit, said filler material being resistant to the effects of temperatures differences from about 75°–80° K. to about 4.5° K. and having a thermal expansion coefficient substantially similar to said thermal expansion coefficient of said superconductive element; and flange means disposed upon said filler material of said integral unit.

4. A composite lead for conducting an electrical current between temperatures from about 75°–80° K. to about 4.5° K., said composite comprising:

at least one discrete superconducting element of determinable dimensions and configuration, said superconducting element having first and second axial ends and an axially extended body, and having a determinable thermal expansion coefficient, and being comprised of at least one high transition temperature superconductor;

an electrically non-conductive filler material covering and encapsulating said superconductive element over most of said axially extended body without covering said first and second axial ends to form an integral unit, said filler material being resistant to the effects of temperature difference from about 75°–80° K. to about 4.5° K. and having a thermal expansion coefficient substantially similar to said thermal expansion coefficient of said superconductive element; and a plurality of temperature segregating walls joined to said filler material of said integral unit for maintaining a range of decreasing temperature from about 75°–80° K. to about 4.5° K. between said first and second axial ends of said integral unit.

* * * * *